United States Patent
Akiyoshi et al.

(10) Patent No.: US 12,043,116 B2
(45) Date of Patent: Jul. 23, 2024

(54) DISPLAY SYSTEM AND MOVING VEHICLE

(71) Applicant: Panasonic Intellectual Property Management Co., Ltd., Osaka (JP)

(72) Inventors: Takahiro Akiyoshi, Fukui (JP); Tomoaki Miyamoto, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 470 days.

(21) Appl. No.: 17/410,664

(22) Filed: Aug. 24, 2021

(65) Prior Publication Data

US 2023/0067951 A1 Mar. 2, 2023

(51) Int. Cl.
  *B60K 35/60* (2024.01)
  *G02B 27/01* (2006.01)
  *B60K 35/23* (2024.01)

(52) U.S. Cl.
  CPC .............. *B60K 35/60* (2024.01); *G02B 27/01* (2013.01); *B60K 35/23* (2024.01); *B60K 2360/691* (2024.01); *B60Y 2200/11* (2013.01)

(58) Field of Classification Search
  CPC ...... B60K 35/213; B60K 35/22; B60K 35/23; B60K 35/60; G02B 27/01
  USPC .......................................................... 296/70
  See application file for complete search history.

(56) References Cited

U.S. PATENT DOCUMENTS

| | | | |
|---|---|---|---|
| 10,203,498 B2 * | 2/2019 | Chen | G02B 27/0101 |
| 10,473,928 B2 * | 11/2019 | Shihaku | B60K 35/00 |
| 2018/0037115 A1 * | 2/2018 | Chonan | G02B 27/01 |
| 2018/0188529 A1 * | 7/2018 | Sato | G03B 21/62 |
| 2019/0219823 A1 * | 7/2019 | Henon | B60K 35/00 |
| 2022/0260835 A1 * | 8/2022 | Tsubakihara | G02B 27/0101 |

FOREIGN PATENT DOCUMENTS

| | | | |
|---|---|---|---|
| FR | 3077648 A1 * | 8/2019 | ............ B60K 35/00 |
| JP | 05-23404 | 3/1993 | |
| JP | 2006-224919 | 8/2006 | |
| JP | 2008-249869 | 10/2008 | |
| JP | 2016-161585 | 9/2016 | |
| JP | 2017-116884 | 6/2017 | |
| JP | 2018-075983 | 5/2018 | |
| JP | 2019-008265 | 1/2019 | |
| JP | 2019-191384 | 10/2019 | |

* cited by examiner

Primary Examiner — Jason S Daniels
(74) Attorney, Agent, or Firm — Greenblum & Bernstein, P.L.C.

(57) ABSTRACT

A display system includes a display and a shielding member. The display has a display screen to display an image thereon. The shielding member has an opening, through which light emerging from the display screen passes. The shielding member defines a shape of the light emerging from the display screen. The display screen has a non-rectangular display area to display the image thereon. At least one peripheral edge of the opening defines a shape that conforms to an outer peripheral shape of the display area.

13 Claims, 16 Drawing Sheets

FIG. 10
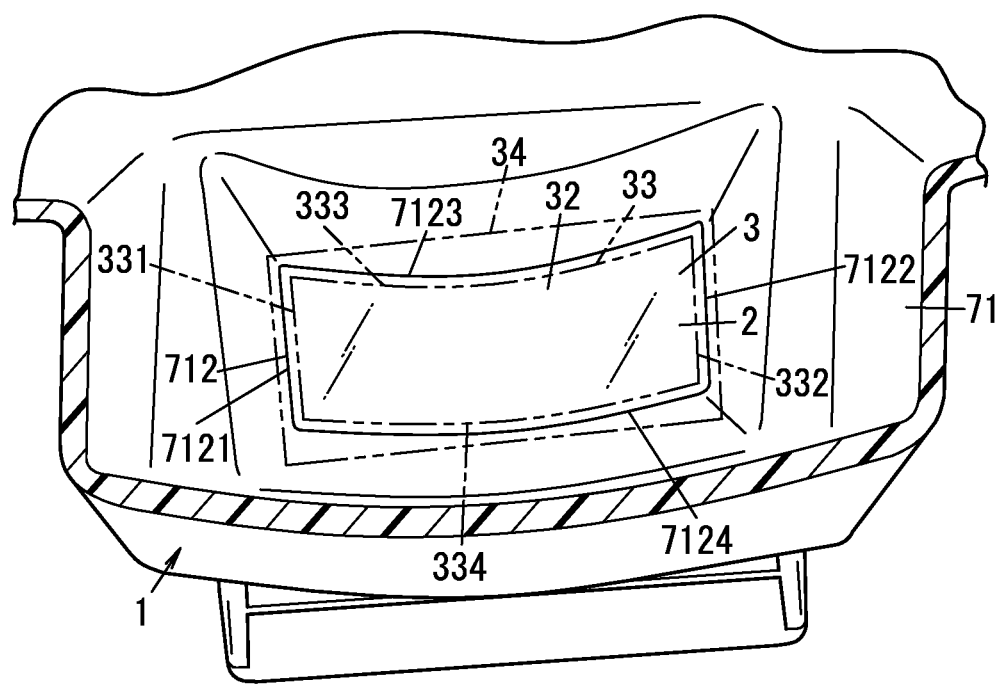
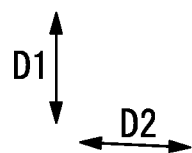

DISPLAY SYSTEM AND MOVING VEHICLE

TECHNICAL FIELD

The present disclosure relates to a display system and a moving vehicle.

BACKGROUND ART

Patent Literature 1 discloses a head-mounted video display device. The video display device includes a liquid crystal display element and an eyepiece optical system for zooming in video displayed on the liquid crystal display element and presenting the zoomed-in video to the viewer. On the display screen of the liquid crystal display element, there are a rectangular video display area, on which video corresponding to an input video signal is displayed, and a frame area which surrounds the video display area and of which the display state does not change. The video display device further includes a shielding member having an opening corresponding to the video display area and provided between the liquid crystal display element and the eyepiece optical system to prevent the viewer from viewing the frame area as a peripheral portion of the liquid crystal display element. An end portion of the opening of the shielding member is provided within the width of the frame area of the video display device. This allows a circuit section and a wire bonding portion, located on the outer periphery of the display screen of the liquid crystal display element, to be hidden by the shielding member. In addition, this also enables presenting video to the viewer without allowing the shielding member to cut off an end portion of the video.

CITATION LIST

Patent Literature

Patent Literature 1: JP 2008-249869 A

SUMMARY OF INVENTION

Technical Problem

The video display area included in the display screen has a rectangular shape. That is to say, Patent Literature 1 fails to disclose a display screen with a non-rectangular display area, and neither teaches nor suggests improving the quality of an image presented with the light emerging from a display screen including a non-rectangular display area.

The present disclosure provides a display system with the ability to improve the quality of an image presented with the light emerging from a display screen including a non-rectangular display area and also provides a moving vehicle including such a display system.

Solution to Problem

A display system according to an aspect of the present disclosure includes a display and a shielding member. The display has a display screen to display an image thereon. The shielding member has an opening, through which light emerging from the display screen passes and defines a shape of the light emerging from the display screen. The display screen has a non-rectangular display area to display the image thereon. At least one peripheral edge of the opening defines a shape that conforms to an outer peripheral shape of the display area.

A moving vehicle according to another aspect of the present disclosure includes a moving vehicle body and the display system described above. The display system is installed in the moving vehicle body.

Advantageous Effects of Invention

A display system and a moving vehicle according to aspects of the present disclosure may improve the quality of an image presented with the light emerging from a display screen including a non-rectangular display area.

BRIEF DESCRIPTION OF DRAWINGS

FIG. 10 is a cross-sectional view illustrating an opening of a first member of the display system;

DETAILED DESCRIPTION

(1) Embodiment (1.1) Moving Vehicle

Figure 1:
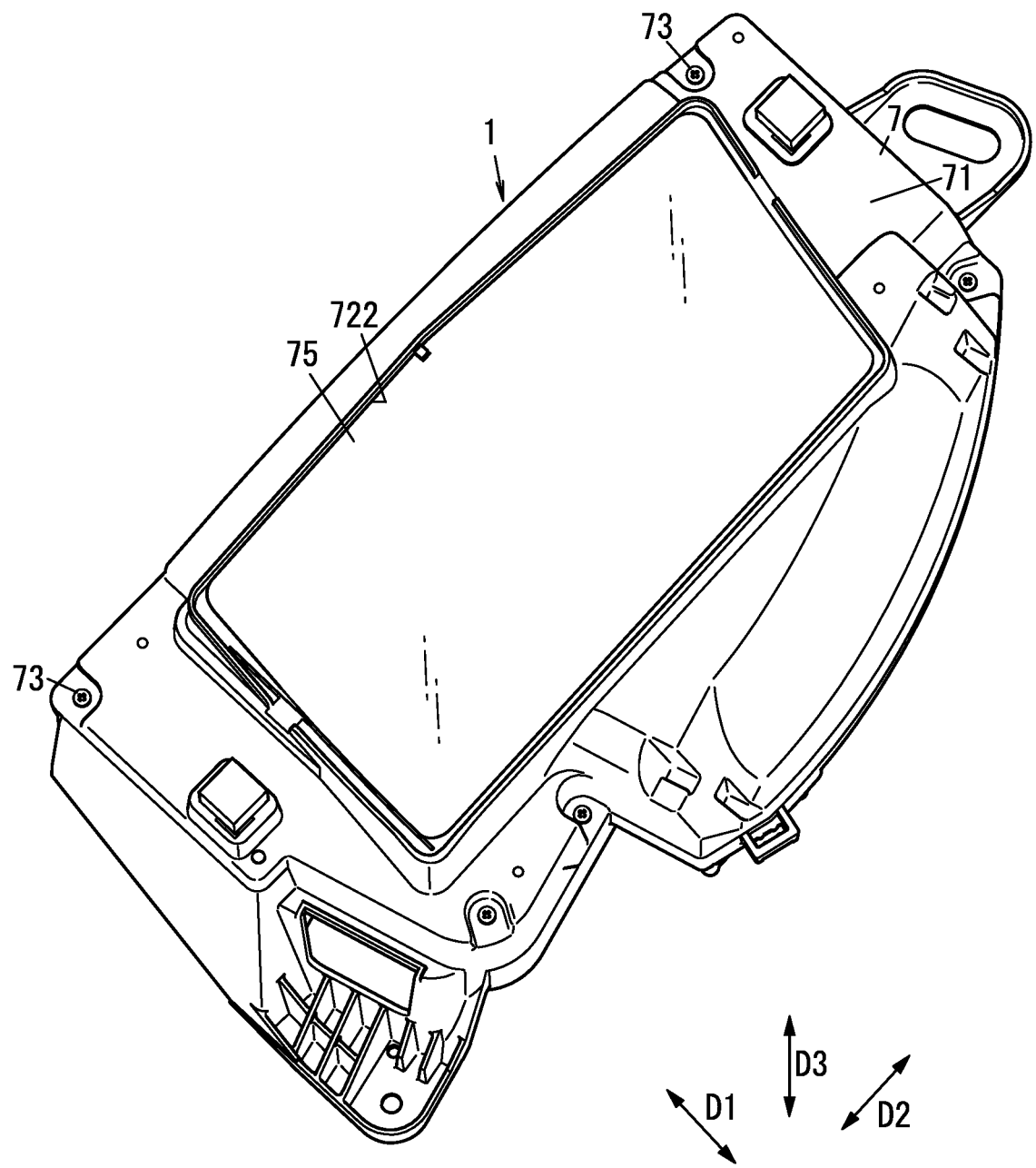
FIG. 1 is a perspective view of a display system according to an exemplary embodiment.
Figure 2:
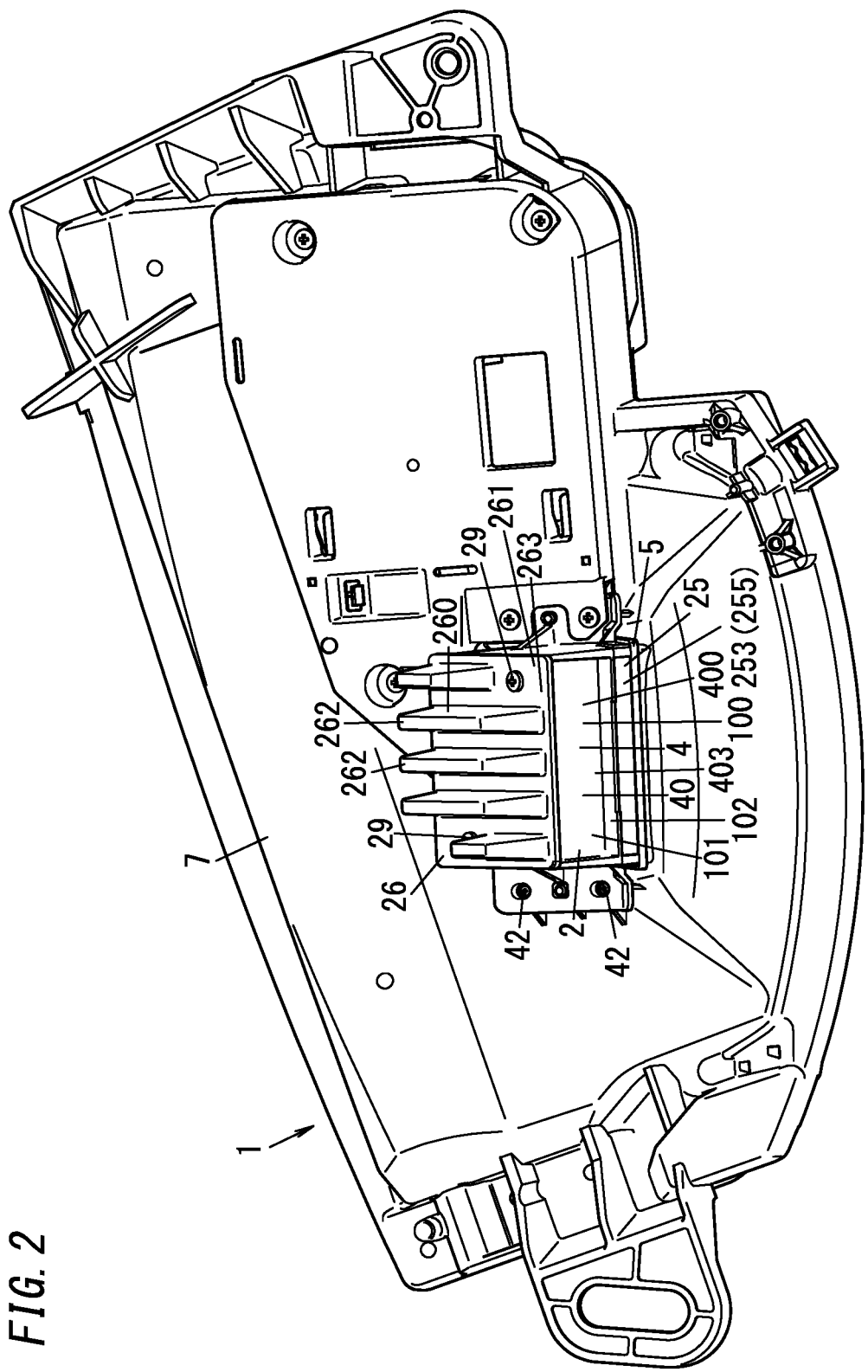
FIG. 2 is a perspective view of the display system as viewed from a different angle from FIG. 1.
Figure 3:
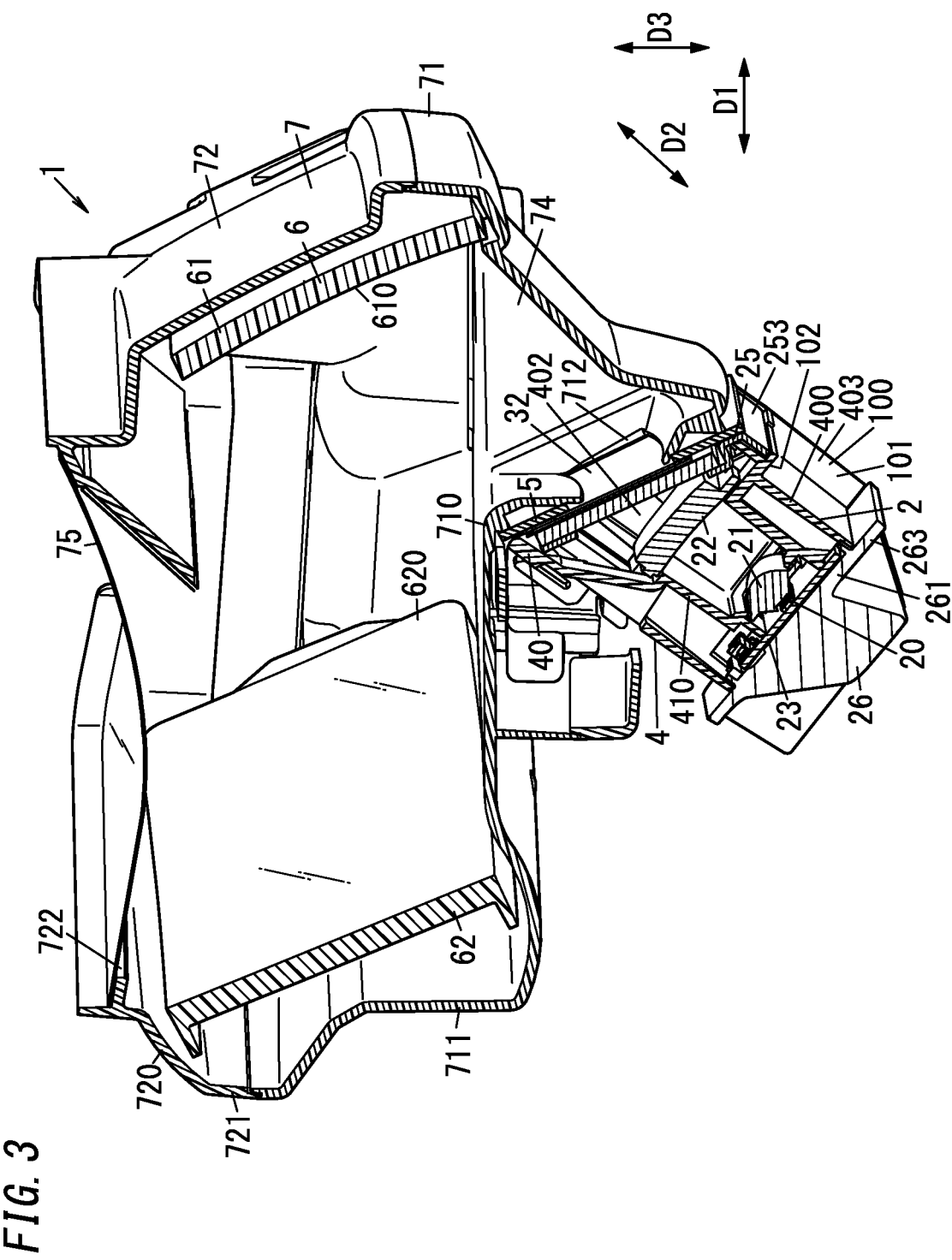
FIG. 3 is a cross-sectional view of the display system.
Figure 4:
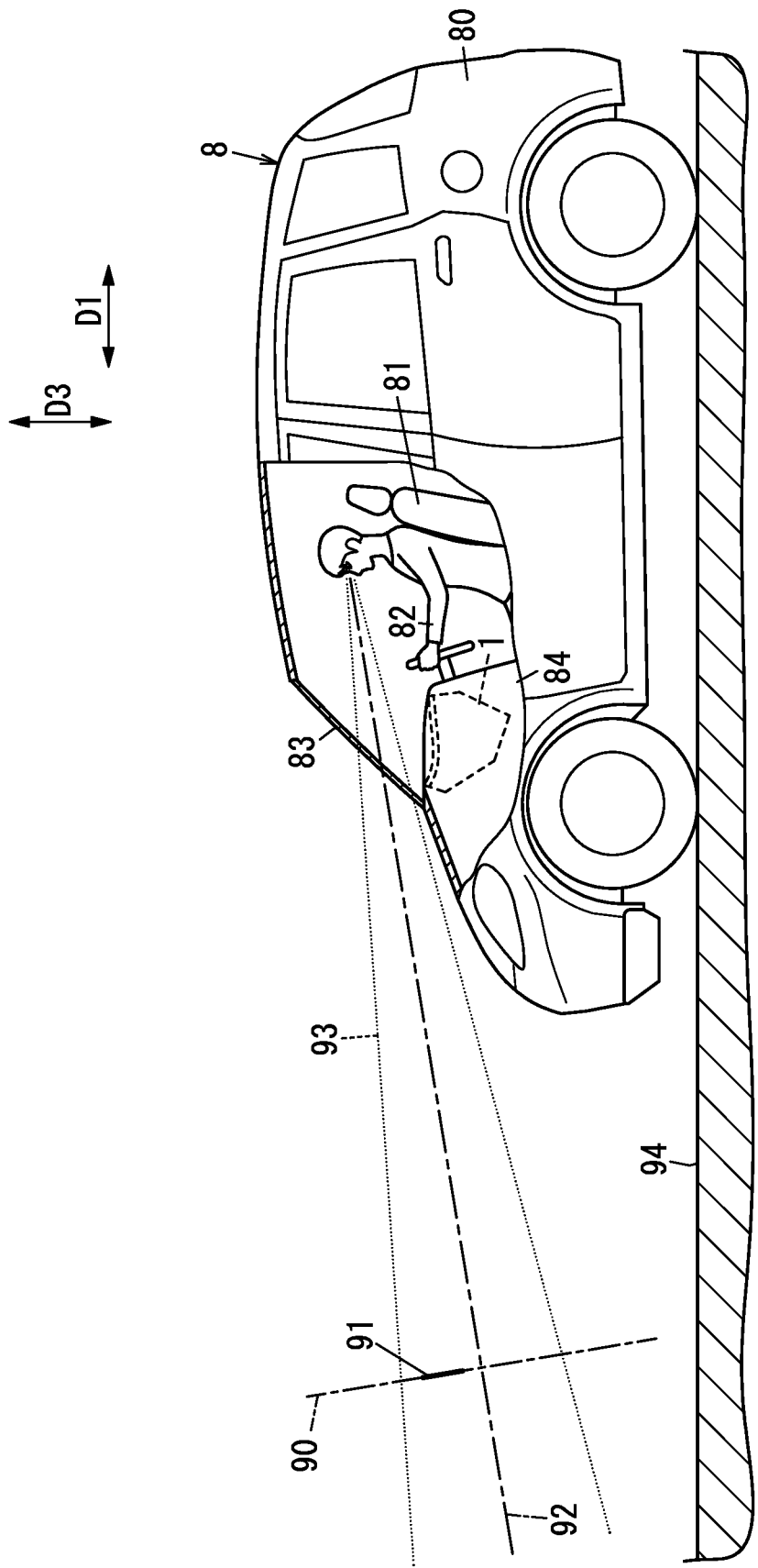
FIG. 4 is a conceptual diagram of a moving vehicle equipped with the display system.

FIGS. 1-3 illustrate a display system 1. FIG. 4 illustrates a moving vehicle 8 including the display system 1. The display system 1 is used as a head-up display in the moving vehicle 8.

The moving vehicle 8 may be an automobile. The moving vehicle 8 includes a moving vehicle body 80 that forms the body of the moving vehicle 8 and the display system 1 installed in the moving vehicle body 80. The moving vehicle body 80 is a vehicle body that may move along a road surface 94. The moving vehicle body 80 according to this embodiment includes a driver's seat 81 and a steering wheel 82 on the right half of the moving vehicle body 80.

Figure 5:
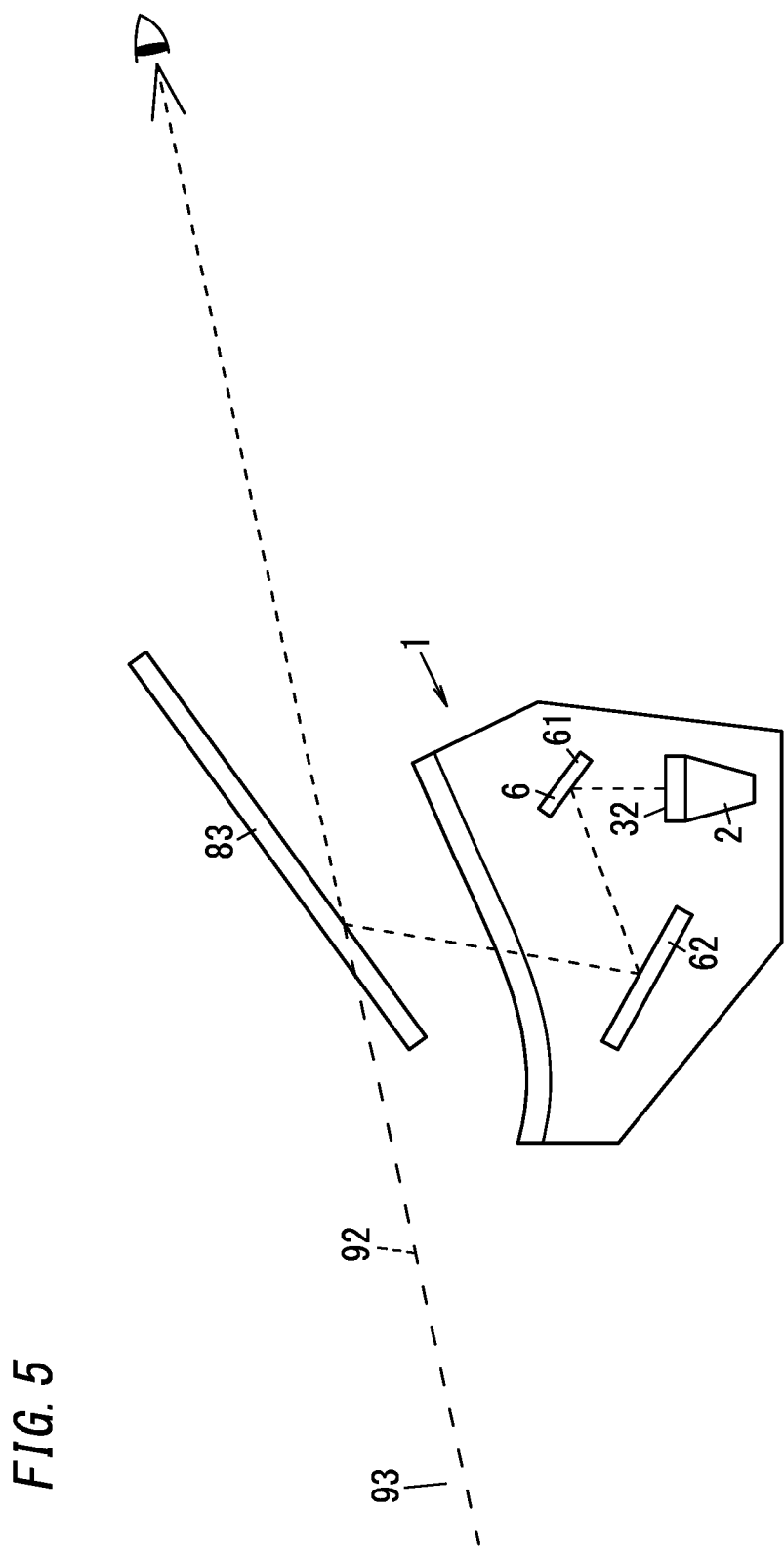
FIG. 5 is a conceptual diagram illustrating how the display system operates.

The moving vehicle body 80 includes a windshield 83 and a dashboard 84. The dashboard 84 is provided below the windshield 83. The display system 1 is installed in the moving vehicle body 80 so as to irradiate the windshield 83 with light representing an image 91 from under the windshield 83. In this embodiment, the display system 1 is installed in the dashboard 84 and located in front of the driver's seat 81. As shown in FIG. 5, when the windshield 83 is irradiated with the light emerging from the display system 1, the light is reflected from the windshield 83 to enter the eye-box of the user who is the driver.

(1.2) Display System

The display system 1 irradiates the windshield 83 with the light, thereby projecting an image 91 to be a virtual image onto a target space 93 which is set in front of the automobile as shown in FIG. 4. Such an image 91 will be hereinafter referred to as a "virtual image 91." In this case, the user views, through the windshield 83, the virtual image 91 projected onto the target space 93. As used herein, the "virtual image" refers to an image formed, as if an object were actually present there, on the user's eyes by diffused light, when the light emerging from the display system 1 is reflected and diffused from a reflector such as the windshield 83 to turn into the diffused light. This allows the user who is driving the moving vehicle 8 to view the virtual image 91 projected by the display system 1 such that the virtual image 91 is superimposed on his or her view of the real space in front of the automobile. Thus, this display system 1 allows the user to be presented as the virtual image 91 with, and visually recognize, various types of driver assistance information including vehicle velocity information, navigation information, pedestrian information, foregoing vehicle information, lane deviation information, and vehicle condition information. This allows the user to visually acquire the driver assistance information just by shifting his or her gaze only slightly in the state where he or she is watching the real space in front of the windshield 83.

The display system 1 forms the virtual image 91 on a virtual plane 90 which intersects with the optical axis 92 of the display system 1. In this embodiment, the optical axis 92 extends, in the target space 93 in front of the moving vehicle 8, along the road surface 94. The virtual plane 90 on which the virtual image 91 is formed is substantially perpendicular to the road surface 94. For example, if the road surface 94 is a horizontal plane, the virtual image 91 is displayed on a vertical plane. In the following description, the display system 1 will be described with three axes that are perpendicular to each other defined as an X-axis, a Y-axis, and a Z-axis, respectively, and with an X-axis direction, a Y-axis direction, and a Z-axis direction defined as a first direction D1, a second direction D2, and a third direction D3, respectively, as shown in FIGS. 1, 4, and other drawings.

As shown in FIG. 5, the display system 1 includes a projection unit 2 and an optical system 6. The projection unit 2 has a display screen 32. On the display screen 32, an image to be projected as the virtual image 91 (see FIG. 4) onto the target space 93 is displayed. The optical system 6 guides, toward the windshield 83, the light emerging from the image displayed on the display screen 32 of the projection unit 2. That is to say, the optical system 6 irradiates a predetermined area with the light emerging from the display screen 32. In the following description, the light emerging from the image displayed on the display screen 32 will be hereinafter referred to as "display light."

Figure 6:
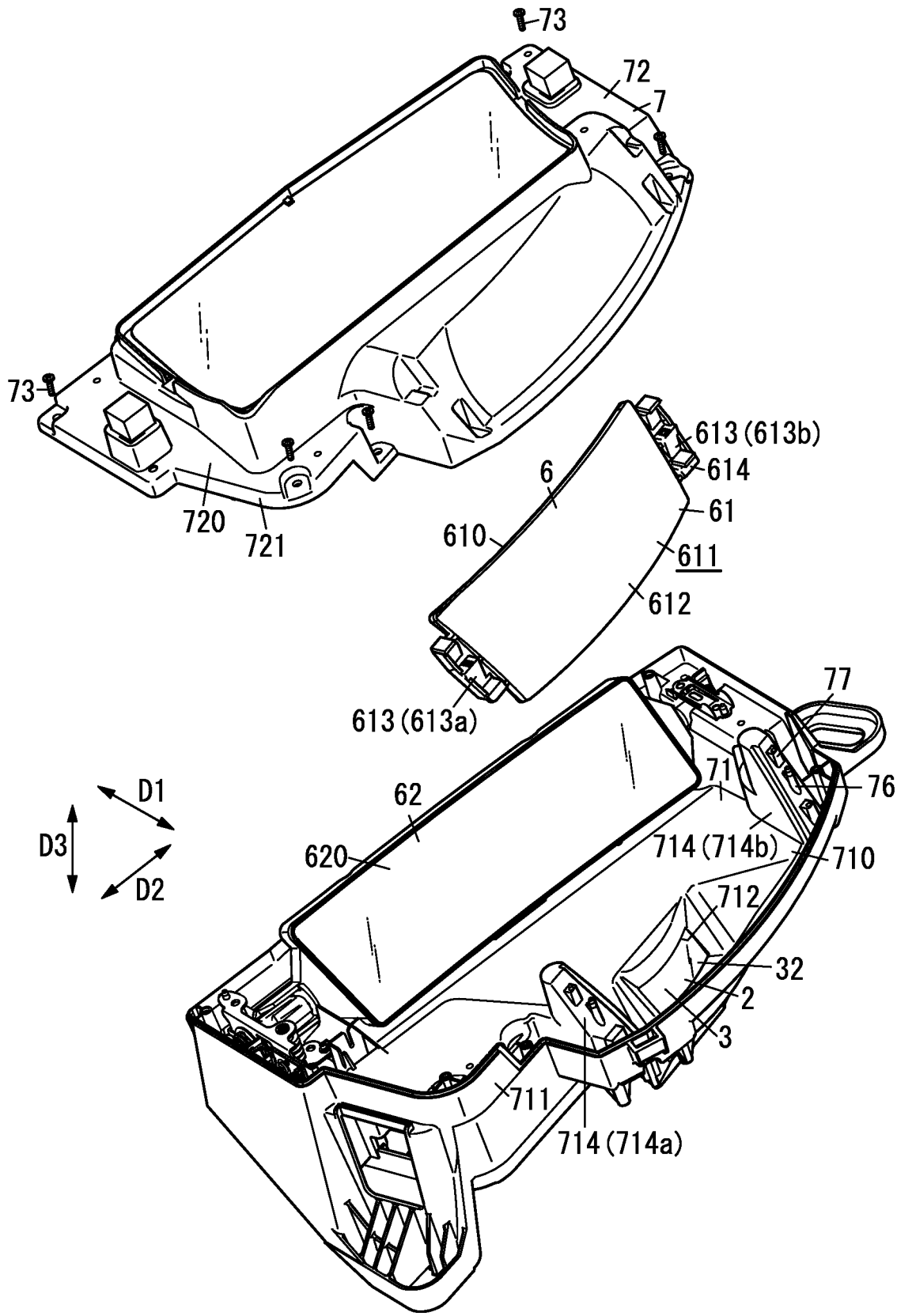
FIG. 6 is an exploded perspective view of the display system.

The display system 1 further includes a casing 7 shown in FIGS. 1 and 2. The casing 7 holds the optical system 6 (see FIG. 3). The casing 7 includes a first member 71 and a second member 72, which may be divided in the third direction D3 as shown in FIG. 6. Each of the first member 71 and the second member 72 is made of resin. The first member 71 and the second member 72 are combined with each other by being moved toward each other in the third direction D3.

The first member 71 is a lower case that will form a lower half of the casing 7 when the display system 1 is installed in the moving vehicle 8. The first member 71 is formed in the shape of a box which is opened toward the second member 72. The first member 71 includes: a bottom portion 710; and a peripheral wall portion 711 protruding from the peripheral edges of the bottom portion 710 toward the second member 72.

The second member 72 is an upper case that will form an upper half of the casing 7 when the display system 1 is installed in the moving vehicle 8. The second member 72 is formed in the shape of a box which is opened toward the first member 71. The second member 72 includes: a ceiling portion 720 facing the bottom portion 710 of the first member 71; and a peripheral wall portion 721 protruding from the peripheral edges of the ceiling portion 720 toward the first member 71. The second member 72 is fixed onto the first member 71 with a plurality of fastening members 73 with an end portion, facing the first member 71, of the peripheral wall portion 721 thereof and an end portion, facing the second member 72, of the peripheral wall portion 711 of the first member 71 abutted on each other. The fastening members 73 may be screws, for example. Alternatively, the fastening members 73 may also be bolts, nails, rivets, or any other suitable members.

As shown in FIG. 3, an internal space 74 is formed inside the casing 7. The internal space 74 is a space surrounded with the bottom portion 710 and peripheral wall portion 711 of the first member 71 and the ceiling portion 720 and peripheral wall portion 721 of the second member 72. The bottom portion 710 of the first member 71 has an opening 712 serving as an inlet port that lets the display light emerging from the display screen 32 of the projection unit 2 enter the casing 7. The opening 712 is a through hole provided through the bottom portion 710 and communicating with the internal space 74 of the casing 7.

The ceiling portion 720 of the second member 72 has an emergent port 722 serving as an outlet port that lets the display light, which has emerged from the display screen 32 of the projection unit 2 and has entered the internal space 74 of the casing 7, go out of the casing 7. The emergent port 722 is a through hole provided through the ceiling portion 720 and communicating with the internal space 74 of the casing 7. The casing 7 further includes a cover 75 having light-transmitting properties. The cover 75 is attached to the second member 72 to cover the emergent port 722 of the second member 72.

Figure 7:
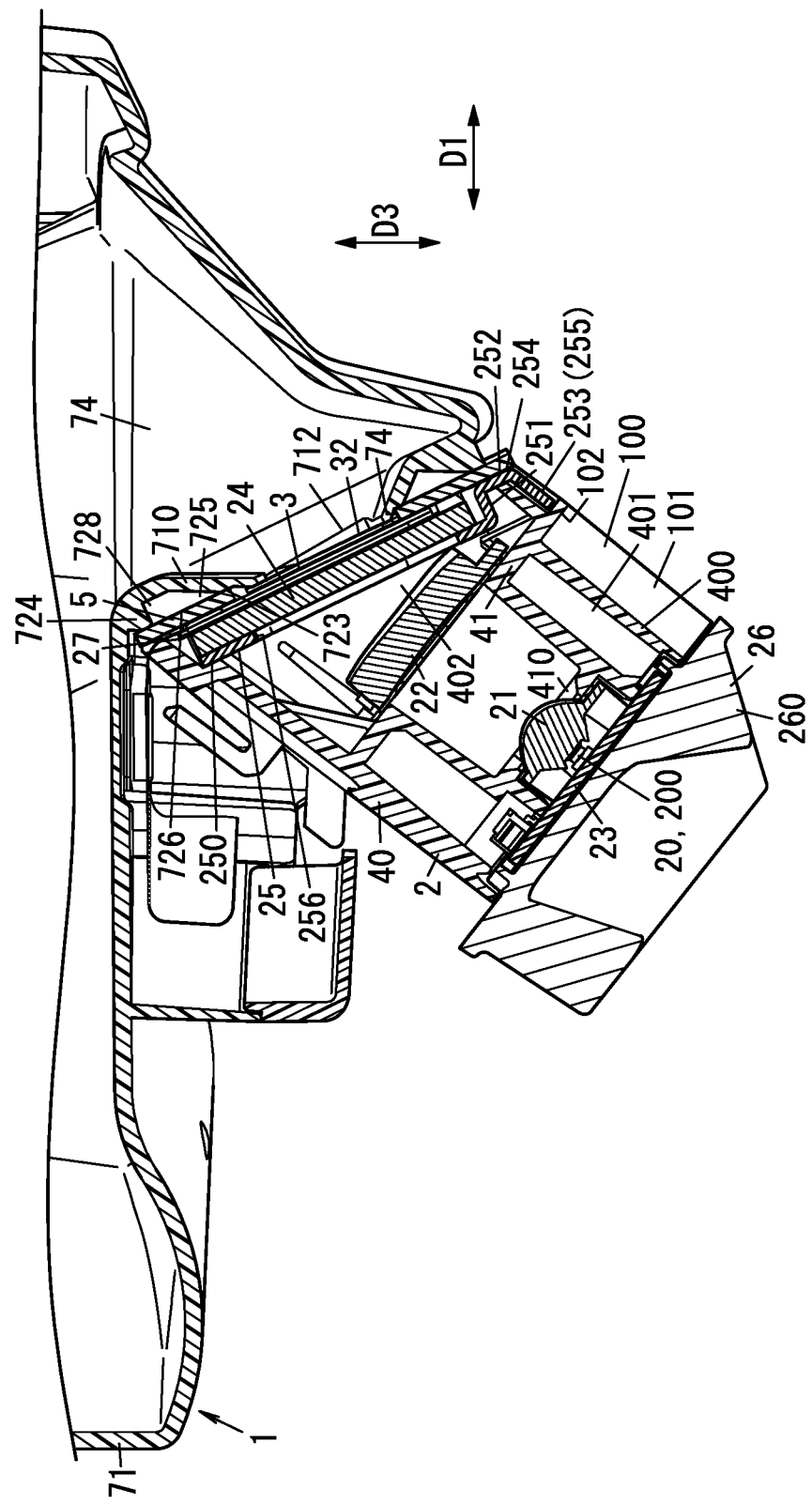
FIG. 7 is an enlarged view of a main part of the display system shown in FIG. 3.

The projection unit 2 is mounted onto the first member 71 so as to be provided along an outer surface of the bottom portion 710 of the first member 71 as shown in FIG. 7. The display screen 32 of the projection unit 2 is provided adjacent to the opening 712 of the casing 7 and faces the internal space 74 of the casing 7 through the opening 712. As shown in FIG. 3, the optical system 6 is provided in the internal space 74 of the casing 7. The display light emerging from the display screen 32 of the projection unit 2 passes through the opening 712 of the casing 7 to enter the internal space 74. After that, the display light is guided by the optical system 6 to the emergent port 722, is transmitted through the cover 75, and then irradiates the windshield 83 (see FIG. 5, for example). That is to say, the internal space 74 of the casing 7 is used as a path for the display light.

The optical system 6 includes two mirrors, namely, a first mirror 61 and a second mirror 62. These mirrors 61, 62 are provided in the internal space 74 of the casing 7. The first mirror 61 has a mirror surface 610 and the second mirror 62 has a mirror surface 620. The mirror surface 610 will be hereinafter referred to as a "first mirror surface 610" and the mirror surface 620 will be hereinafter referred to as a "second mirror surface 620."

The first mirror surface 610 faces the display screen 32 of the projection unit 2. The first mirror surface 610 is a concave surface. Note that the first mirror surface 610 may be a spherical surface or an aspherical surface, whichever is appropriate. Alternatively, the first mirror surface 610 may also be a plane or a convex surface. The first mirror surface 610 reflects, toward the second mirror 62, the light emerging from the projection unit 2.

The second mirror surface 620 faces the first mirror surface 610. The second mirror surface 620 is a concave surface. Note that the second mirror surface 620 may be a spherical surface or an aspherical surface, whichever is appropriate. Alternatively, the second mirror surface 620 may also be a plane or a convex surface. The second mirror surface 620 reflects, toward the windshield 83 (see FIG. 4), the display light that has been reflected from the first mirror surface 610. The display light reflected from the second mirror surface 620 is transmitted through the cover 75 and irradiates the windshield 83. As a result, the virtual image 91 is projected onto the target space 93.

(1.3) Projection Unit

Figure 8:
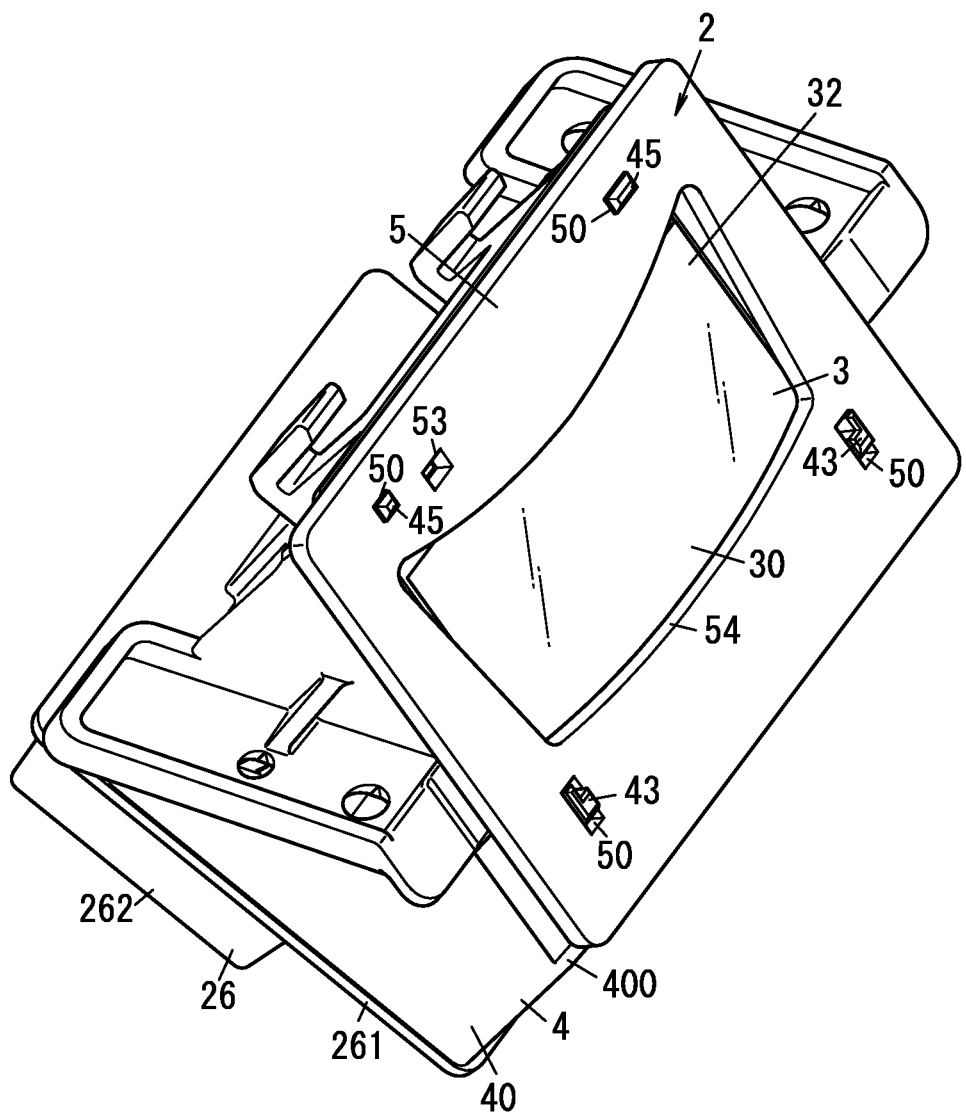
FIG. 8 is a perspective view of a projection unit included in the display system.
Figure 9:
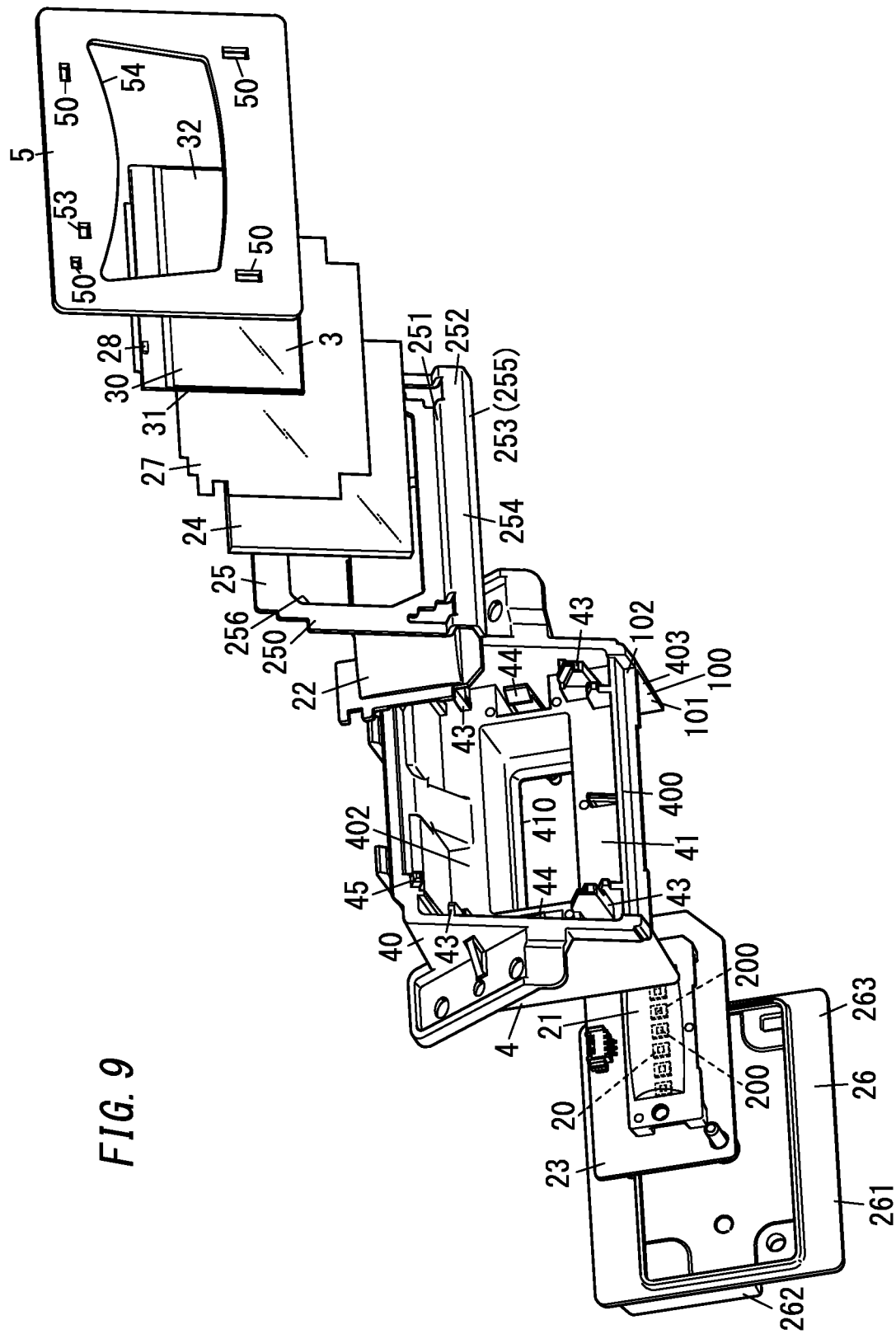
FIG. 9 is an exploded perspective view of the projection unit included in the display system.

FIG. 8 is a perspective view of the projection unit 2 and FIG. 9 is an exploded perspective view of the projection unit 2. The projection unit 2 includes a display 3. The display 3 is a liquid crystal display panel for displaying an image thereon by using light emitted from a backlight. As shown in FIG. 9, the display 3 has a surface 30 and a back surface 31. The surface 30 is one surface along the thickness of the panel-shaped display 3 and the back surface 31 is another surface, opposite from the surface 30, of the display 3. The surface 30 includes the display screen 32 (see FIG. 10) on which an image to be projected onto the target space 93 is displayed. The display screen 32 may form part of the surface 30 of the display 3. Alternatively, the display screen 32 may also be all of the surface 30 of the display 3.

The projection unit 2 further includes a light source 20. The light source 20 is provided opposite from the surface 30 of the display 3 and used as a backlight for the display 3. That is to say, the projection unit 2 displays an image on the display screen 32 of the display 3 by irradiating the display 3 with the light emitted from the light source 20. The light emitted from the light source 20 toward the display 3 will be hereinafter referred to as "illuminating light."

The projection unit 2 further includes a housing 4, a printed wiring board 23, a heat sink 26, a lens 21, another lens 22, another heat sink 25, a heat transfer member 24, a diffuser plate 27, a temperature sensor 28, and an elastic member 5. In the following description, the lens 21 will be hereinafter referred to as a "first lens 21" and the lens 22 will be hereinafter referred to as a "second lens 22." The heat sink 25 will be hereinafter referred to as a "first heat sink 25" and the heat sink 26 will be hereinafter referred to as a "second heat sink 26."

The housing 4 houses the printed wiring board 23, the light source 20, the first lens 21, the second lens 22, a part of the first heat sink 25, the heat transfer member 24, the diffuser plate 27, the display 3, and the temperature sensor 28. The housing 4 is made of a resin. The housing 4 includes a cylindrical portion 40 and a partition 41. The cylindrical portion 40 is formed in a rectangular frame shape when viewed along the axis of the cylindrical portion 40. The cylindrical portion 40 includes a wall portion 400. The wall portion 400 forms one side of the rectangular-frame-shaped cylindrical portion 40 and faces backward when the display system 1 is installed in the moving vehicle 8. In the following description, one end along the axis of the cylindrical portion 40 will be hereinafter simply referred to as "one end" and the other end along the axis of the cylindrical portion 40 and opposite from the one end will be hereinafter simply referred to as "the other end."

As shown in FIG. 7, an end surface at the one end of the cylindrical portion 40 is provided along the outer surface of the bottom portion 710 of the first member 71 of the casing 7 with the elastic member 5 interposed between themselves. In this manner, the housing 4 is mounted onto the first member 71 with a plurality of fastening members 42 (see FIG. 2) to extend along the outer surface of the casing 7. This allows the projection unit 2 to be fixed onto the casing 7. The respective fastening members 42 may be screws. Alternatively, the respective fastening members 73 may also be bolts, nails, rivets, or any other suitable members.

The partition 41 is provided inside, and connected integrally to, the cylindrical portion 40. The partition 41 partitions the inside of the cylindrical portion 40 into a first region 401 located closer to the other end of the cylindrical portion 40 and a second region 402 located closer to the one end of the cylindrical portion 40. The partition 41 has a through hole 410 provided through the partition 41 along the axis of the cylindrical portion 40. The hole 410 communicates with the first region 401 and the second region 402.

As shown in FIG. 9, the housing 4 further includes a plurality of ribs 43. These ribs 43 are provided in the second region 402 and connected to the partition 41 and the cylindrical portion 40. The housing 4 further includes a plurality of latching portions 44. Each of the latching portions 44 protrudes from the partition 41 toward the one end of the cylindrical portion 40.

The housing 4 further includes a plurality of protrusions 45 (see FIG. 8). These protrusions 45 are formed on the cylindrical portion 40. Each of the protrusions 45 protrudes from an end surface at the one end (i.e., closer to the first member 71) of the cylindrical portion 40 toward the first member 71.

As shown in FIG. 7, the printed wiring board 23 and the light source 20 are provided in the first region 401. The printed wiring board 23 is provided along a surface at the other end of the partition 41. The light source 20 includes a plurality of light-emitting diodes 200 mounted on a surface, facing the one end, of the printed wiring board 23. The plurality of light-emitting diodes 200 is provided to face to the hole 410 of the partition 41. The plurality of light-emitting diodes 200 emits illuminating light toward the hole 410 of the partition 41. Note that the light source 20 needs to include at least one light-emitting diode 200 and may include only one light-emitting diode 200. Also, the light-emitting element included in the light source 20 does not have to be the light-emitting diode 200 but may also be a light bulb, a discharge lamp, or an organic electroluminescent element, for example.

The second heat sink 26 dissipates the heat generated by the printed wiring board 23 and the light source 20 out of the housing 4. This reduces the chances of the printed wiring board 23 and the light source 20 having a high temperature. The second heat sink 26 is made of a metallic material and has a heat transfer property superior to that of the housing 4. The second heat sink 26 may be made of aluminum and formed by die casting, for example. The second heat sink 26 is provided along an end surface at the other end of the cylindrical portion 40 of the housing 4. The second heat sink 26 covers the first region 401 and the printed wiring board 23 located in the first region 401 from the other end. The second heat sink 26 and printed wiring board 23 are mounted onto the housing 4 with the plurality of fastening members 29 shown in FIG. 2. Those fastening members 29 may be screws, for example. Alternatively, the fastening members 29 may also be bolts, nails, rivets, or any other suitable members.

Most of the second heat sink 26 is a heat-dissipating portion 260 exposed on the outer surface of the housing 4. The heat of the second heat sink 26 is dissipated from the heat-dissipating portion 260. As shown in FIG. 7, the second heat sink 26 is in contact with the printed wiring board 23, and thereby thermally connected to the printed wiring board 23 and the light source 20.

As shown in FIG. 2, the heat-dissipating portion 260 of the second heat sink 26 includes: a plate portion 261 provided along an end surface at the other end of the cylindrical portion 40; and a plurality of fins 262 protruding from the plate portion 261 away from the cylindrical portion 40.

The first lens 21 shown in FIG. 7 is sandwiched between the printed wiring board 23 and the partition 41. This allows the first lens 21 to be fixed onto the housing 4. The first lens 21 is made of a resin. The first lens 21 refracts the illuminating light emitted from the light source 20 and irradiates the second lens 22 with the refracted light. This allows the illuminating light to impinge on the second lens 22 efficiently.

In the second region 402 of the housing 4, the second lens 22, the first heat sink 25, the heat transfer member 24, the diffuser plate 27, and the display 3 are located. The second lens 22, the first heat sink 25, the heat transfer member 24, the diffuser plate 27, and the display 3 are arranged in this order from the partition 41 toward the one end of the cylindrical portion 40.

The second lens 22 is made of a resin. The second lens 22 is provided along a surface at the one end of the partition 41. The second lens 22 is surrounded with the plurality of ribs 43 of the housing 4 shown in FIG. 9. The plurality of ribs 43 regulates the movement of the second lens 22 in a direction intersecting with the axis of the housing 4. Parts of the second lens 22 are located between the latching portions 44 of the housing 4 and the partition 41 and hooked on the latching portions 44. The latching portions 44 regulate the movement of the second lens 22 toward the one end of the cylindrical portion 40. The second lens 22 covers the hole 410 of the partition 41. The second lens 22 refracts the illuminating light that has passed through the first lens 21 and irradiates the heat transfer member 24 with the refracts light. This allows the illuminating light to impinge on the heat transfer member 24 efficiently.

The first heat sink 25 dissipates the heat generated by the display 3 out of the housing 4. This reduces, even if the display 3 is irradiated with the illuminating light or sunlight, for example, the chances of the display 3 coming to have a high temperature. The first heat sink 25 is formed in a plate shape. Specifically, the first heat sink 25 is made of a sheet metal and is formed by subjecting a metal plate to a bending process.

The first heat sink 25 includes a contact portion 250 and an extended portion 254. The first heat sink 25 consists of the contact portion 250 and the extended portion 254. The contact portion 250 is located in the second region 402 inside the housing 4. The contact portion 250 is formed in the shape of a rectangular frame when viewed along a normal to the display screen 32 and in the form of a plate parallel to the display screen 32 of the display 3. A through hole 256 is provided inside the frame-shaped contact portion 250. The through hole 256 is a rectangular hole that penetrates through the contact portion 250 along the axis of the cylindrical portion 40. The illuminating light that has passed through the second lens 22 passes through the through hole 256 to be incident on the heat transfer member 24.

The contact portion 250 is supported by the cylindrical portion 40 of the housing 4 and some of the plurality of ribs 43 from the other end of the cylindrical portion 40. The cylindrical portion 40 and the plurality of ribs 43 regulate the movement of the contact portion 250 in a direction intersecting with the axis of the housing 4. The contact portion 250 is in contact with the heat transfer member 24. The heat transfer member 24 is in contact with the diffuser plate 27. The diffuser plate 27 is in contact with the display 3. This allows the contact portion 250 of the first heat sink 25 to be thermally connected to the display 3 via the heat transfer member 24 and the diffuser plate 27. Therefore, the heat of the display 3 is transferred to the contact portion 250 through the diffuser plate 27 and the heat transfer member 24.

The extended portion 254 is extended from the contact portion 250. Part of the extended portion 254 is a heat-dissipating portion 255 located on the outer surface of the housing 4. The heat of the contact portion 250 is transferred to the extended portion 254 and is dissipated from the heat-dissipating portion 255. The extended portion 254 is connected to an end edge, facing a wall portion 400 of the housing 4, of the contact portion 250. The extended portion 254 extends along the entire length of the end edge, facing the wall portion 400, of the contact portion 250.

The extended portion 254 is formed in a U-shape when viewed in a direction in which the end edge, facing the wall portion 400, of the contact portion 250 extends. The extended portion 254 includes a first piece 251, a second piece 252, and a third piece 253. The first piece 251, the second piece 252, and the third piece 253 are continuous with each other in this order from one side of the contact portion 250. The first piece 251 protrudes from the end edge, facing the wall portion 400, of the contact portion 250 toward the one end of the cylindrical portion 40 along an inner surface of the wall portion 400. The second piece 252 protrudes from an end edge, opposite from the contact portion 250, of the first piece 251 away from the contact portion 250 along an end surface at the one end of the wall portion 400. The third piece 253 protrudes from an end edge, opposite from the first piece 251, of the second piece 252 toward the other end of the cylindrical portion 40 along an outer surface of the wall portion 400. As shown in FIG. 7, a surface, opposite from the wall portion 400, of the third piece 253 is not covered with the housing 4 but is exposed on the outer surface of the housing 4. In this embodiment, the third piece 253 forming one end portion of the first heat sink 25 serves as the heat-dissipating portion 255 that dissipates the heat of the first heat sink 25.

In the first heat sink 25 shown in FIG. 9, only the second piece 252 and the third piece 253 provided at one end portion of the first heat sink 25 are located outside of the housing 4 while the rest of the first heat sink 25 is located inside the housing 4. Thus, the first heat sink 25 is covered with the housing 4 in three out of four directions defined with respect to the first heat sink 25. This reduces the chances of the first heat sink 25 gathering dust, dirt, and other foreign particles present outside of the housing 4. As used herein, the "four directions" refer to four directions which are parallel to a plane that is perpendicular to the thickness of the contact portion 250 and which intersect with each other at right angles. To reduce the chances of the first heat sink 25 gathering dust, dirt, and other foreign particles, the first heat sink 25 needs to be covered with the housing 4 in at least one of the four directions between the housing 4 and the first member 71. Thus, the first heat sink 25 may be covered with the housing 4 in only one or two of the four directions. Alternatively, the first heat sink 25 may or may not be covered with the housing 4 in all of the four directions.

The first piece 251 and second piece 252 of the extended portion 254 are located closer to the one end of the cylindrical portion 40 (i.e., closer to the surface 30) than the back surface 31 of the display 3, and the second piece 252 and the third piece 253 are located outside of the housing 4. That is to say, the extended portion 254 includes a portion consisting of the second piece 252 and located closer to the surface 30 of the display 3 than the back surface 31 thereof and provided outside of the housing 4. This allows a part of the extended portion 254 to be located outside of the housing 4 with the display 3 supported by the contact portion 250 from the back surface 31, thus improving the heat dissipation capability of the first heat sink 25.

As shown in FIGS. 2 and 3, the projection unit 2 includes a thermal insulation structure 100. The thermal insulation structure 100 is provided between the first heat sink 25 and the second heat sink 26 to thermally insulate the first heat sink 25 and the second heat sink 26 from each other. The thermal insulation structure 100 has a thermal insulation space 101 and a thermal insulation portion 102. The thermal insulation space 101 is a space inside a recess 403 provided on the outer surface of the cylindrical portion 40 of the housing 4. The recess 403 is provided on the outer surface of the wall portion 400 of the cylindrical portion 40 and has a rectangular shape when viewed along a normal to the wall portion 400. The recess 403 is opened toward the other end of the cylindrical portion 40 (i.e., toward the second heat sink 26).

The plate portion 261 of the second heat sink 26 includes an overlapping portion 263 which overlaps with the third piece 253 of the first heat sink 25 when viewed along the axis of the housing 4. The thermal insulation space 101 is located between the third piece 253 of the first heat sink 25 and the overlapping portion 263 of the second heat sink 26. In the thermal insulation space 101, there is the air having a lower thermal conductivity than the housing 4. This reduces the chances of the heat of the heat-dissipating portion 260 of the second heat sink 26 being transferred to the heat-dissipating portion 255 of the first heat sink 25, thus curbing a decline in the heat dissipation capability of the first heat sink 25.

The thermal insulation portion 102 is a projection provided on the outer surface of the cylindrical portion 40 of the housing 4. The thermal insulation portion 102 is provided along an end surface at the other end (i.e., opposite from the second piece 252) of the third piece 253 of the first heat sink 25. The thermal insulation portion 102 may or may not be in contact with the third piece 253.

A surface at the other end (i.e., opposite from the third piece 253) of the thermal insulation portion 102 constitutes a surface at the one end (i.e., facing the third piece 253) of the recess 403. The thermal insulation portion 102 faces the overlapping portion 263 of the second heat sink 26 via the thermal insulation space 101. That is to say, the thermal insulation portion 102 is located between the third piece 253 and the overlapping portion 263 of the second heat sink 26. This allows the heat radiated from the overlapping portion 263 of the second heat sink 26 toward the third piece 253 of the first heat sink 25 to be easily cut off by the thermal insulation wall, thus reducing the transfer of the heat from the overlapping portion 263 to the third piece 253.

The heat transfer member 24 shown in FIG. 7 transfers, to the first heat sink 25, the heat that has been transferred from the display 3 to the heat transfer member 24 via the diffuser plate 27. The heat transfer member 24 is made of glass and has light-transmitting properties. The heat transfer member 24 is formed in the shape of a rectangular plate elongated in the rightward/leftward direction when viewed along a normal to the display screen 32 and provided along a surface, facing the first member 71, of the contact portion 250 of the first heat sink 25. That is to say, the heat transfer member 24 is a glass pane. The heat transfer member 24 is sandwiched between the contact portion 250 and the diffuser plate 27. The heat transfer member 24 is surrounded with the plurality of ribs 43 and the cylindrical portion 40 of the housing 4 shown in FIG. 9. The cylindrical portion 40 and the plurality of ribs 43 regulate the movement of the heat transfer member 24 in a direction intersecting with the axis of the cylindrical portion 40. The heat transfer member 24 covers the through hole 256 of the first heat sink 25. The illuminating light that has passed through the through hole 256 of the first heat sink 25 passes through the heat transfer member 24 and impinges on the diffuser plate 27. A surface at the one end of the heat transfer member 24 is in contact with a surface at the other end of the diffuser plate 27 either entirely or mostly. This facilitates transferring the heat of the diffuser plate 27 to the heat transfer member 24.

The diffuser plate 27 diffuses the illuminating light that has passed through the heat transfer member 24. The diffuser plate 27 is made of a resin and has light-transmitting properties. The diffuser plate 27 is a sheet with a generally rectangular shape. The diffuser plate 27 is sandwiched between the heat transfer member 24 and the display 3. The diffuser plate 27 is surrounded with the plurality of ribs 43 of the housing 4. The plurality of ribs 43 regulates the movement of the diffuser plate 27 in a direction intersecting with the axis of the cylindrical portion 40. The illuminating light diffused by the diffuser plate 27 impinges on the back surface 31 of the display 3. A surface, facing the display 3, of the diffuser plate 27 covers the back surface 31 of the display 3 either entirely or mostly. This facilitates transferring the heat of the display 3 to the heat transfer member 24 via the diffuser plate 27.

The display 3 is sandwiched between the diffuser plate 27 and the elastic member 5. The display 3 is supported by the contact portion 250 of the first heat sink 25 from the other end via the diffuser plate 27 and the heat transfer member 24. That is to say, the first heat sink 25 supports the display 3 from the other side opposite from the display screen 32. The display 3 is formed in the shape of a generally rectangular panel. The display 3 is surrounded with the cylindrical portion 40 and the plurality of ribs 43 of the housing 4. The cylindrical portion 40 and the plurality of ribs 43 regulate the movement of the display 3 in a direction intersecting with the axis of the cylindrical portion 40. That is to say, the housing 4 positions the display 3.

The display screen 32 of the display 3 is a rectangular area on the surface 30 of the display 3. The illuminating light irradiating the back surface 31 of the display 3 via the diffuser plate 27 is transmitted through the display 3 to emerge from the display screen 32 as display light. The display light emerging from the display screen 32 has an optical axis perpendicular to the display screen 32.

As shown in FIG. 10, the display screen 32 has a display area 33 and a non-display area 34. Note that in FIG. 10, the respective outer peripheral edges of the display area 33 and the non-display area 34 are indicated by two-dot chains. The display screen 32 according to this embodiment consists of the display area 33 and the non-display area 34. The display area 33 is an area on which an image is displayed and is an area, facing active liquid crystal molecules of the display 3, of the display screen 32 (i.e., an active area). The image includes, for example, characters and figures. The image may be a still picture or a moving picture, whichever is appropriate. The non-display area 34 is a frame-shaped area surrounding the display area 33 and is adjacent to the display area 33. The non-display area 34 has an invariable display state and does not display any image thereon but allows the illuminating light that has been transmitted through the display 3 to emerge therefrom as the display light.

The display area 33 does not have a rectangular shape. Specifically, the display area 33 is a generally quadrangular area, of which the outer peripheral edges are defined by first, second, third, and fourth sides 331, 332, 333, 334 and which are surrounded with these four sides 331-334. The first side 331 and the second side 332 are spaced from each other in the second direction D2. The third side 333 and the fourth side 334 are spaced from each other in the first direction D1. When the display system 1 is installed in the moving vehicle 8, the first side 331 will be located on the left of the second side 332 and the third side 333 will be located forward of the fourth side 334.

The third side 333 connects one end of the first side 331 and one end of the second side 332 together. The fourth side 334 connects the other end, opposite from the third side 333, of the first side 331 and the other end, opposite from the third side 333, of the second side 332 together. The first side 331 and the second side 332 are each linear, while the third side 333 and the fourth side 334 are each curved. The first side 331 is substantially parallel to the first direction D1. The second side 332 is tilted with respect to the first direction D1 such that as the distance to the fourth side 334 decreases, the distance from the first side 331 to the second side 332 decreases. That is to say, when viewed along a normal to the display screen 32, the tilt angle formed by the first side 331 with respect to the first direction D1 is smaller than the tilt angle formed by the second side 332 with respect to the first direction D1. The third side 333 has the shape of an arc which is convex toward the fourth side 334. The fourth side 334 has the shape of an arc which is convex away from the third side 333 and of which the curvature is smaller than the curvature of the third side 333. In the first direction D1, one end, connected to the third side 333, of the first side 331 is located closer to the fourth side 334 than one end, connected to the third side 333, of the second side 332. In the first direction D1, one end, connected to the fourth side 334, of the first side 331 is located more distant from the third side 333 than one end, connected to the fourth side 334, of the second side 332.

Figure 12:
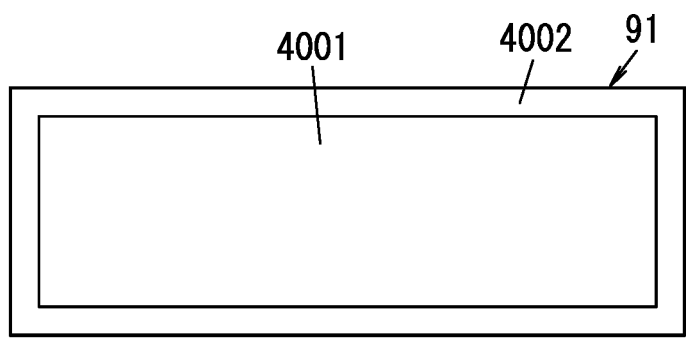
FIG. 12 is a front view illustrating an image projected by the display system.

Forming the display area 33 in such a non-rectangular shape makes an area (i.e., a first area 4001 to be described later) formed, in the virtual image 91 (see FIG. 4) projected onto the target space 93, by the display light emerging from the display area 33 a rectangular area elongated in the rightward/leftward direction (see FIG. 12). That is to say, the display light emerging from the non-rectangular display area 33 will be corrected when impinging on a curved inner surface of the windshield 83 via the first mirror 61, the second mirror 62, and the cover 75 (see FIG. 5). Thus, a rectangular image formed by the display light emerging from the display area 33 is projected onto the target space 93.

The temperature sensor 28 shown in FIG. 9 is a thermistor to detect the temperature of the display 3. The temperature sensor 28 according to this embodiment is attached to an area, other than the display area 33, of the surface 30 of the display 3 and is provided on a surface, facing the elastic member 5, of the display 3. The temperature sensor 28 detects the temperature of the surface 30. The temperature detected by the temperature sensor 28 may be used, for example, to detect any abnormality in the display 3. Note that the temperature sensor 28 does not have to be a thermistor but may also be a thermocouple, for example.

The elastic member 5 shown in FIG. 3 relaxes the force applied from the first member 71 of the casing 7 to the display 3 and the housing 4, thereby reducing the impact and vibration transmitted from the first member 71 to the housing 4 and the display 3. The elastic member 5 is formed in the shape of a plate parallel to the display screen 32 of the display 3. As shown in FIG. 8, the elastic member 5 is formed in the shape of a frame with a rectangular profile when viewed along a normal to the display screen 32. The elastic member 5 is made of a urethane foam resin and has elasticity. The elastic member 5 is provided along an end surface at the one end of the display screen 32 of the display 3 and the cylindrical portion 40 of the housing 4. Note that the elastic member 5 only needs to be a member with elasticity and may also be made of rubber, for example.

The elastic member 5 has a plurality of fitting holes 50. Each of the fitting holes 50 penetrates through the elastic member 5 along a normal to the display screen 32 (i.e., along the thickness of the elastic member 5). Into the plurality of fitting holes 50, some of the plurality of ribs 43 of the housing 4 and a plurality of projections 45 are fitted. Some of the plurality of ribs 43 and the plurality of projections 45 regulate the movement of the elastic member 5 in a direction intersecting with the axis of the cylindrical portion 40. That is to say, the elastic member 5 is fixed to the housing 4.

The elastic member 5 is fixed to an end surface at the one end of the cylindrical portion 40 of the housing 4 with a double-sided adhesive tape. In addition, some of the plurality of ribs 43 of the housing 4 and the plurality of projections 45 are each press-fitted into an associated one of the fitting holes 50. This allows the elastic member 5 to be fixed to the housing 4. The elastic member 5 is attachable to, and removable from, the housing 4. Thus, removing the elastic member 5 from the housing 4 allows each of the display 3, the diffuser plate 27, the heat transfer member 24, the first heat sink 25, and other members, which are held by the elastic member 5, to be removed from the housing 4. Note that the method of fixing the elastic member 5 to the housing 4 may be changed. For example, the elastic member 5 may be fixed to the housing 4 only with the double-sided adhesive tape. Alternatively, the elastic member 5 may also be fixed to the housing 4 only by press-fitting each of those ribs 43 and the plurality of projections 45 into an associated one of the fitting holes 50. Still alternatively, the elastic member 5 may also be fixed to the housing 4 by another means such as an adhesive.

The elastic member 5 has a sensor hole 53. The sensor hole 53 penetrates through the elastic member 5 along a normal to the display screen 32. The sensor hole 53 faces the temperature sensor 28 (see FIG. 9) attached to the surface 30 of the display 3. That is to say, the sensor hole 53 is provided through a portion, corresponding to the temperature sensor 28, of the elastic member 5.

The temperature sensor 28 is arranged to face the sensor hole 53 and is out of contact with the elastic member 5. This reduces, even if force is applied from the first member 71, for example, to the elastic member 5, the chances of the force being transmitted to the temperature sensor 28 via the elastic member 5. Thus, the temperature sensor 28 is hardly subjected to external force.

The elastic member 5 fixed to the housing 4 is in contact with the display 3 as shown in FIG. 7, thus regulating the movement of the first heat sink 25, the diffuser plate 27, the heat transfer member 24, and the display 3 toward the one end of the housing 4. That is to say, the elastic member 5 also serves as a press member for regulating the movement of the first heat sink 25, the diffuser plate 27, the heat transfer member 24, and the display 3 toward the one end of the housing 4.

The elastic member 5 is pressed directly against the first member 71 by the surface 30 of the display 3 and an end surface at the one end of the cylindrical portion 40. Thus, the elastic member 5 is sandwiched not only between the display 3 and the first member 71 but also between the housing 4 and the first member 71. The elastic member 5 is provided along the entire circumference of the cylindrical portion 40 to seal the gap between the cylindrical portion 40 and the first member 71. This reduces the chances of dust, dirt, and other foreign particles entering the inside of the housing 4 in which the display 3 and other members are housed.

Figure 11:
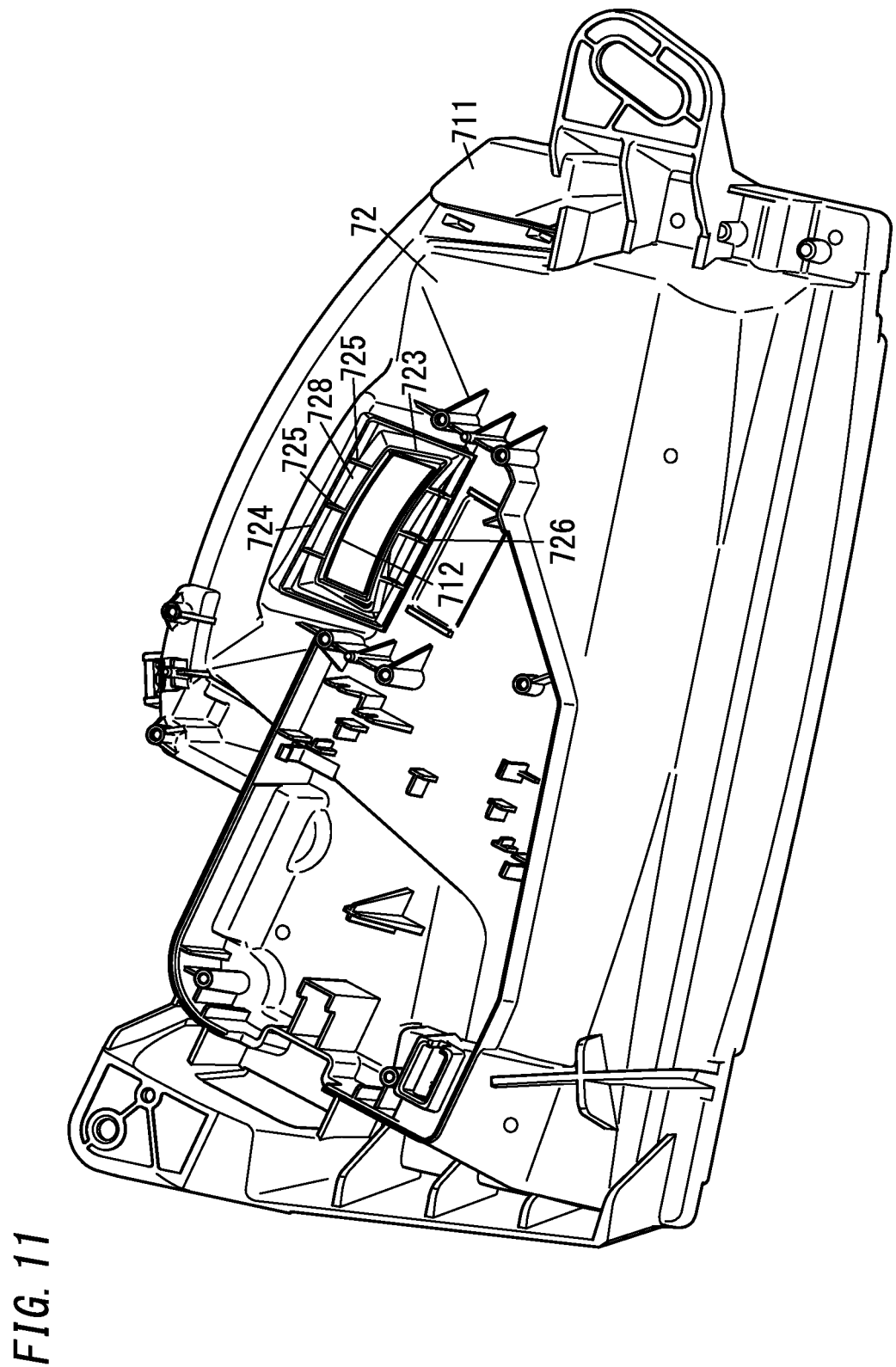
FIG. 11 is a perspective view of a second member of the display system.

As shown in FIG. 11, the first member 71 further includes an inner sandwiching portion 723, an outer sandwiching portion 724, and a plurality of ribs 725. The inner sandwiching portion 723 is a frame-shaped portion provided on the bottom portion 710 of the first member 71 to surround the opening 712 and is located outward of, and away from, the peripheral edges of the opening 712.

The outer sandwiching portion 724 protrudes toward the projection unit 2 (i.e., outward of the bottom portion 710) from around the inner sandwiching portion 723 on the bottom portion 710. The outer sandwiching portion 724 is formed in the shape of a rectangular frame that surrounds the inner sandwiching portion 723. The frame-shaped outer sandwiching portion 724 is provided outside of, and away from, the frame-shaped inner sandwiching portion 723. The plurality of ribs 725 protrudes outward of the bottom portion 710 from an annular region 728 located between the inner sandwiching portion 723 and the outer sandwiching portion 724 on the bottom portion 710. The plurality of ribs 725 are arranged at intervals along the circumference of the annular region 728. The plurality of ribs 725 extends linearly in the same direction when viewed along a normal to the display screen 32. The rest of the annular region 728 of the bottom portion 710 but the plurality of ribs 725 is a recess, which is depressed toward the inner surface of the bottom portion 710. The frame-shaped inner sandwiching portion 723 and the frame-shaped outer sandwiching portion 724 are connected together via the plurality of ribs 725.

As shown in FIG. 7, the respective end surfaces, facing the projection unit 2, of the inner sandwiching portion 723, the outer sandwiching portion 724, and the plurality of ribs 725 are flush with each other to form a plane and are in contact with a surface, opposite from the display 3, of the elastic member 5. The elastic member 5 is sandwiched between, and compressed by, the portion, consisting of the inner sandwiching portion 723, the outer sandwiching portion 724, and the plurality of ribs 725, of the bottom portion 710 and the portion, consisting of the display 3 and cylindrical portion 40, of the projection unit 2.

The display 3 presses a first part, surrounding a portion corresponding to the opening 712, of the elastic member 5 (i.e., a part corresponding to the inner sandwiching portion 723) against the first member 71. In addition, the housing 4 presses a second part, surrounding the first part, of the elastic member 5 (i.e., a part corresponding to the outer sandwiching portion 724) against the first member 71. Thus, the elastic member 5 is sandwiched at two points by the frame-shaped inner sandwiching portion 723 and the frame-shaped outer sandwiching portion 724 provided outside of the inner sandwiching portion 723. This reduces the chances of dust, dirt, and other foreign particles entering the inside of the cylindrical portion 40 through the gap between the bottom portion 710 of the first member 71 and the cylindrical portion 40 of the housing 4. In addition, the end surface 726, facing the projection unit 2, of each rib 725 is a plane that serves as a guide surface aligned with a surface, opposite from the display 3, of the elastic member 5. This allows, when the projection unit 2 is mounted onto the first member 71, the elastic member 5 of the projection unit 2 to slide along the guide surface formed by the plurality of ribs 725 thus facilitating mounting the projection unit 2 onto the first member 71.

As shown in FIG. 8, a window hole 54, which penetrates through the elastic member 5 along a normal to the display screen 32 (i.e., along the thickness of the elastic member 5), is provided inside the frame-shaped elastic member 5. The window hole 54 is located on the optical path of the display light emerging from the display screen 32 of the display 3. When viewed along a normal to the display screen 32, the window hole 54 has a larger size than the display area 33 of the display screen 32 (see FIG. 10) and has a shape similar to that of the display area 33. The window hole 54 allows only the display light emerging from the entire display area 33 and the display light emerging from an inner peripheral portion of the non-display area 34 to pass, out of the display light emerging from the display screen 32. That is to say, the elastic member 5 cuts off only the display light emerging from an outer peripheral portion of the frame-shaped non-display area 34 and does not cut off the display light emerging from the entire display area 33 or the display light emerging from an inner peripheral portion of the non-display area 34, out of the display light emerging from the display screen 32. Note that the elastic member 5 does not have to cut off the display light emerging from the display screen 32. That is to say, in that case, all of the display light emerging from the display screen 32 passes through the window hole 54.

The display light that has passed through the window hole 54 of the elastic member 5 passes through the opening 712 of the first member 71 shown in FIG. 7 and irradiates the first mirror 61 (see FIG. 3). That is to say, the opening 712 is located on the optical path of the display light emerging from the display screen 32. When viewed along a normal to the display screen 32, the opening 712 has a smaller size than the window hole 54 of the elastic member 5 and the peripheral edges of the opening 712 are located inside the peripheral edges of the window hole 54. Thus, the peripheral edges of the opening 712 of the first member 71 cut off an outer peripheral portion of the display light emerging from the display screen 32 of the display 3, thereby defining the shape of the display light. That is to say, in this case, the first member 71 serves as a shielding member that defines the shape of the display light emerging from the display screen 32 of the display 3. In other words, the shielding member forms part of the casing 7.

As shown in FIG. 10, the peripheral edges of the opening 712 of the first member 71 define a shape aligned with the outer peripheral shape of the display area 33 when viewed along a normal to the display screen 32. As used herein, the "shape aligned with the outer peripheral shape of the display area 33" refers to not only a shape that perfectly confirms to the peripheral edges of the display area 33 but also a shape similar to the peripheral edges of the display area 33, when viewed along a normal to the display screen 32.

In this embodiment, the peripheral edges of the opening 712 of the first member 71 define a shape similar to the outer peripheral shape of the display area 33. In addition, when viewed along a normal to the display screen 32, the opening 712 of the first member 71 has a larger size than the display area 33 and the peripheral edges of the opening 712 are located outside of the outer peripheral edges of the display area 33. This reduces, even if the dimensions, mount positions, and other parameters of the respective members of the display system 1 are slightly different from originally designed ones, the chances of the display light emerging from the display area 33 being cut off by the peripheral edges of the opening 712 of the first member 71. As used herein, the "similar shapes" refer to not only a situation where the peripheral edge shape of the display area 33 and the peripheral edge shape of the opening 712 are perfectly similar to each other but also a situation where the peripheral edge shape of the display area 33 and the peripheral edge shape of the opening 712 are approximately similar to each other with the gap between the peripheral edge shape of the display area 33 and the peripheral edge shape of the opening 712 varying within a predetermined range when viewed along a normal to the display screen 32.

Specifically, the peripheral edges of the opening 712 has first, second, third, and fourth sides 7121, 7122, 7123, 7124 respectively corresponding to the first, second, third, and fourth sides 331, 332, 333, 334 of the display area 33 when viewed along a normal to the display screen 32. The opening 712 is a generally quadrangular area, of which the peripheral edges are defined by the four sides, namely, the first to fourth sides 7121-7124, and which is surrounded with these four sides 7121-7124. The first side 7121 and the second side 7122 are spaced apart from each other in the second direction D2. The third side 7123 and the fourth side 7124 are spaced apart from each other in the first direction D1. When the display system 1 is installed in the moving vehicle 8, the first side 7121 will be located on the left of the second side 7122 and the third side 7123 will be located forward of the fourth side 7124.

The third side 7123 connects one end of the first side 7121 and one end of the second side 7122 together. The fourth side 7124 connects the other end, opposite from the third side 7123, of the first side 7121 and the other end, opposite from the third side 7123, of the second side 7122 together. The first side 7121 and the second side 7122 are each linear, while the third side 7123 and the fourth side 7124 are each curved. The first side 7121 is substantially parallel to the first direction D1. The second side 7122 is tilted with respect to the first direction D1 such that as the distance to the fourth side 7124 decreases, the distance from the first side 7121 to the second side 7122 decreases. That is to say, when viewed along a normal to the display screen 32, the tilt angle formed by the first side 7121 with respect to the first direction D1 is smaller than the tilt angle formed by the second side 7122 with respect to the first direction D1. The third side 7123 has the shape of an arc which is convex toward the fourth side 7124. The fourth side 7124 has the shape of an arc which is convex away from the third side 7123 and of which the curvature is smaller than the curvature of the third side 7123. In the first direction D1, one end, connected to the third side 7123, of the first side 7121 is located closer to the fourth side 7124 than one end, connected to the third side 7123, of the second side 7122. In the first direction D1, one end, connected to the fourth side 7124, of the first side 7121 is located more distant from the third side 7123 than one end, connected to the fourth side 7124, of the second side 7122.

That is to say, the peripheral edges of the opening 712 according to this embodiment are made up of two linear sides and line curved sides. Note that the peripheral edge shape of the opening 712 only needs to be aligned with the outer peripheral edges of the display area 33 and is not limited to the shape according to this embodiment. For example, the peripheral edges of the opening 712 may have only one curved side or three or more curved sides. Also, the opening 712 does not have to have a generally quadrangular shape but may also have a triangular, generally pentagonal, circular, elliptical, or any other appropriate shape. Still alternatively, the opening 712 may have a rectangular shape.

The display light that has passed through the opening 712 of the first member 71 impinges on the windshield 83 without being cut off by any other member after that. Thus, the virtual image 91 projected by the display system 1 onto the target space 93 is formed by the display light emerging from the display area 33 of the display screen 32 and the display light emerging from the inner peripheral portion of the non-display area 34. That is to say, the virtual image 91 includes a first area 4001 formed by the display light emerging from the display area 33 and a second area 4002 formed by the display light emerging from the inner peripheral portion of the non-display area 34 as shown in FIG. 12. In this case, if the dimensions, mount positions, and other parameters of the respective members of the display system 1 are slightly different from the originally designed ones, then the second area 4002 may fail to be displayed partially but the first area 4001 is highly likely to be displayed entirely. The reason is that the peripheral edges of the opening 712 of the first member 71 are larger than the peripheral edges of the display area 33 as described above.

In the display system 1 according to this embodiment, the peripheral edges of the opening 712 of the first member 71 are aligned with the outer peripheral shape of the display area 33 as shown in FIG. 10. This facilitates making the virtual image 91 to be projected by the display system 1 onto the target space 93 a good-looking, hardly unnatural image in which the outer peripheral edges of the second area 4002 are aligned with the outer peripheral edges of the first area 4001.

Figure 13:
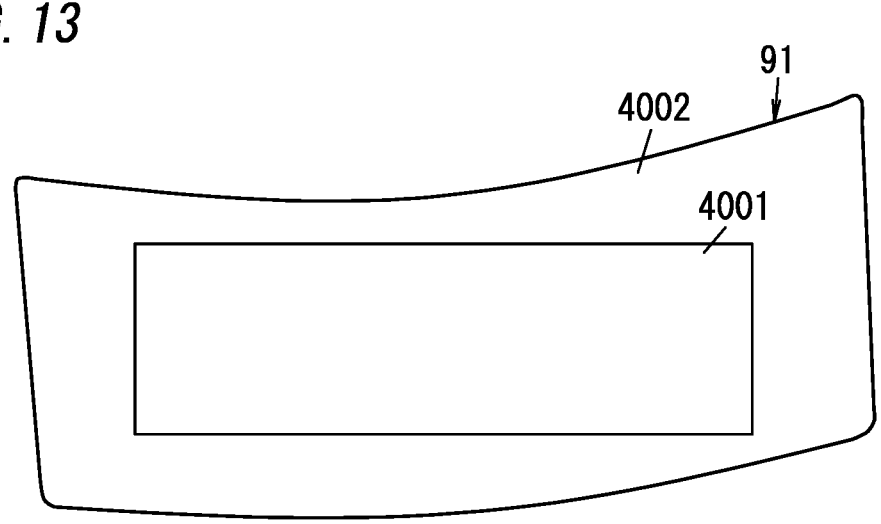
FIG. 13 is a front view illustrating an image projected by a display system according to a comparative example.

If the peripheral edges of the opening 712 of the first member 71 had a rectangular shape, then the virtual image 91 to be projected by the display system 1 onto the target space 93 would be likely to have a shape in which the outer peripheral edges of the second area 4002 are misaligned with the outer peripheral edges of the first area 4001 as shown in FIG. 13. Comparing FIGS. 12 and 13 with each other, it can be seen that the display system 1 according to this embodiment may make the virtual image 91 a good-looking image.

In addition, the elastic member 5 according to this embodiment also serves as a press member for regulating the movement of the first heat sink 25, the diffuser plate 27, the heat transfer member 24, and the display 3 toward the first member 71 as shown in FIG. 7. This may cut down the number of components of the projection unit 2. Also, if the projection unit 2 had a press member for regulating the movement of the elastic member 5 toward the first member 71, then not only the elastic member 5 but also the press member would be provided between the display 3 and the first member 71 of the casing 7, thus often increasing the distance from the display screen 32 of the display 3 to the opening 712 of the first member 71. This would increase the chances of the display light emerging from the display screen 32 being cut off by the peripheral edges of the opening 712 of the first member 71 to make the range usable as the display area 33 of the display screen 32 narrower. In the projection unit 2 according to this embodiment, on the other hand, there is no need to provide any press member separately from the elastic member 5. This reduces the chances of the display light emerging from the display screen 32 being cut off by the peripheral edges of the opening 712 of the first member 71, thus enabling making a more effective use of the display area 33 of the display screen 32.

Figure 14A:
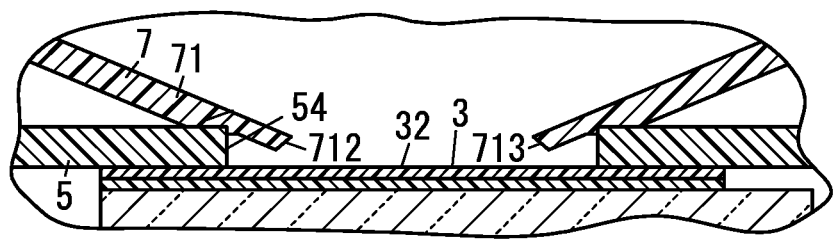
FIG. 14A is a cross-sectional view illustrating a portion, surrounding a display device, of a display system according to a variation.
Figure 14B:
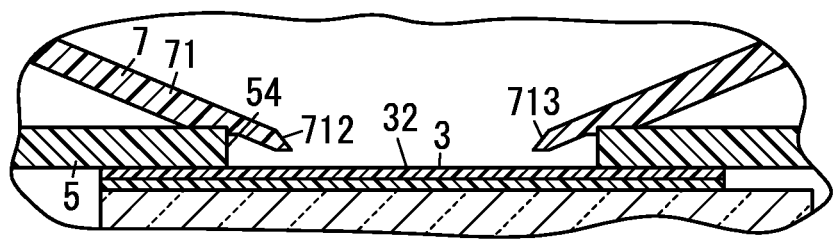
FIG. 14B is a cross-sectional view illustrating a portion, surrounding a display device, of a display system according to another variation.

In this embodiment, the inner peripheral surfaces constituting the peripheral edges of the opening 712 of the first member 71 are parallel to a normal to the display screen 32 of the display 3. Alternatively, the inner peripheral surfaces constituting the peripheral edges of the opening 712 of the first member 71 may also be tilted surfaces 713, each of which forms a tilt angle with respect to the normal to the display screen 32 as shown in FIGS. 14A and 14B. The tilted surface 713 shown in FIG. 14A is tilted such that the shorter the distance from a point on the tilted surface 713 to the display screen 32 is, the closer to one of the outer peripheral edges of the opening 712 the point is. On the other hand, the tilted surface 713 shown in FIG. 14B is tilted such that the shorter the distance from a point on the tilted surface 713 to the display screen 32 is, the closer to one of the inner peripheral edges of the opening 712 the point is. Making the inner peripheral surfaces constituting the peripheral edges of the opening 712 of the first member 71 such tilted surfaces 713 reduces the quantity of the display light emerging from the display screen 32 which is cut off by the peripheral edges of the opening 712, thus enabling making a more effective use of the display area 33 of the display screen 32.

Figure 14C:
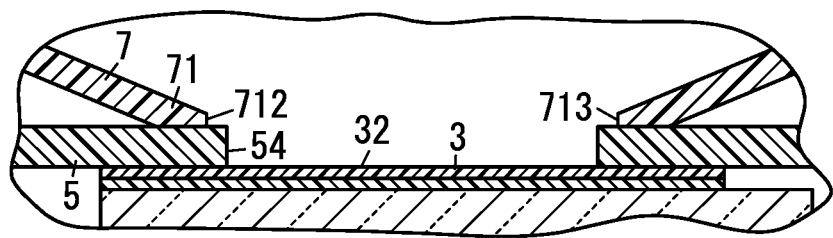
FIG. 14C is a cross-sectional view illustrating a portion, surrounding a display device, of a display system according to still another variation.

Furthermore, in this embodiment, the shielding member defining the shape of the display light emerging from the display screen 32 of the display 3 is the first member 71. However, this is only an example and should not be construed as limiting. Alternatively, the shielding member may also be a member other than the first member 71. FIG. 14C illustrates an example in which the elastic member 5 is used as a shielding member. In this example, the shape of the display light emerging from the display screen 32 is defined by the peripheral edges of the window hole 54 of the elastic member 5 and the window hole 54 has the same shape and dimensions as the opening 712 according to the embodiment described above. Using the elastic member 5 that is attachable to, and removable from, the housing 4 as the shielding member in this manner allows the elastic member 5 to be replaced with another elastic member 5, of which the window hole 54 (opening) has a different shape. Thus, even when the display system 1 is installed in another moving vehicle 8, for example, a good-looking virtual image 91 may also be projected just by replacing the elastic member 5 with another elastic member 5 having a window hole 54 that has a shape suitable to that moving vehicle 8.

(1.4) First Mirror and its Mount Structure

Figure 15:
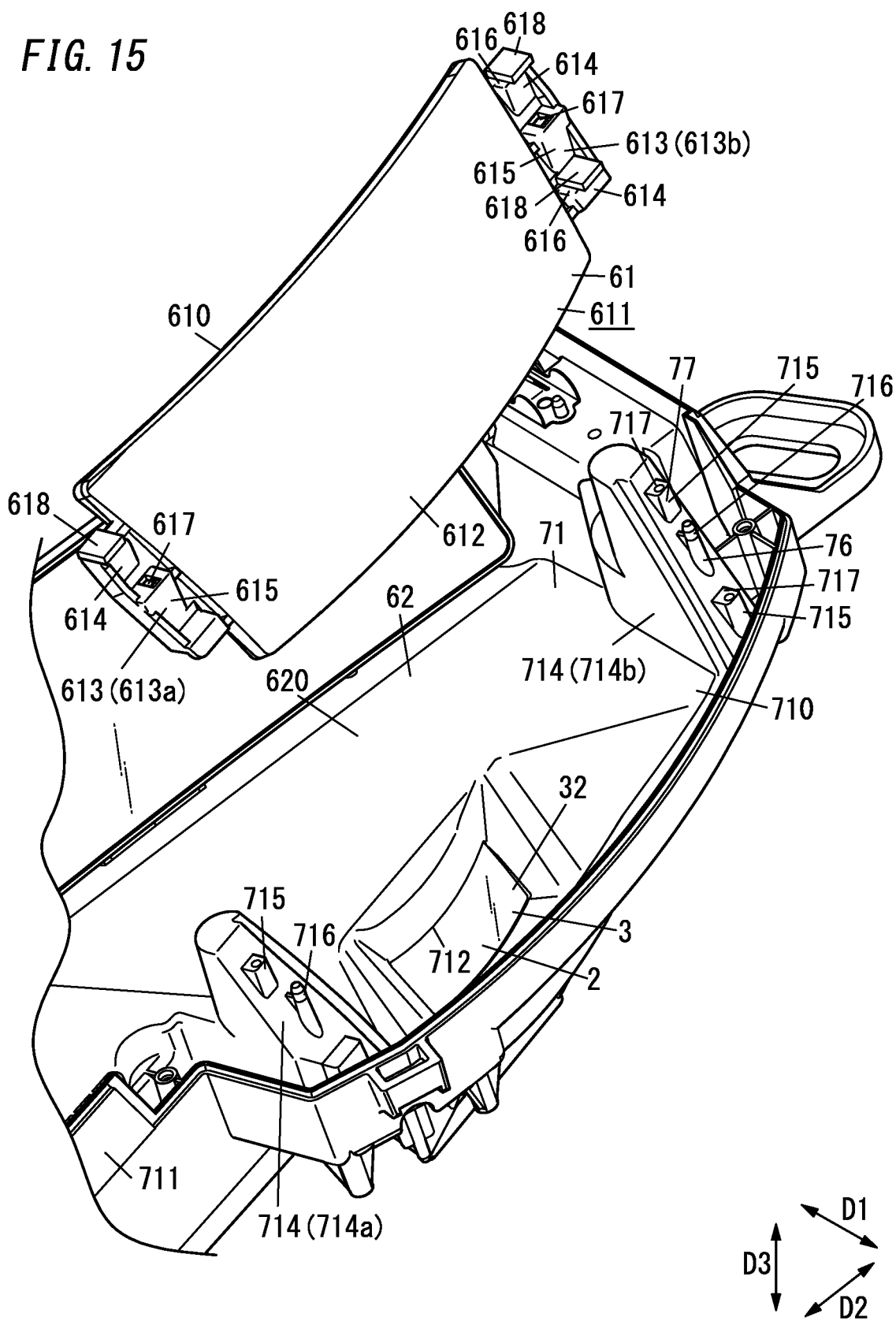
FIG. 15 is an exploded perspective view of a first member and a second mirror of the display system.

The first mirror 61 includes a first mirror surface 610 and a holding member 611 that holds the first mirror surface 610 thereon as shown in FIG. 15. The holding member 611 is made of a resin. The holding member 611 includes a holding portion 612 and a pair of fixing portions 613. The holding portion 612 is formed as a plate which is substantially parallel to the display screen 32 of the projection unit 2 and which has a generally rectangular shape when viewed along a normal to the display screen 32. The holding portion 612 is curved such that the surface facing the projection unit 2 is a concave surface and the surface facing away from the projection unit 2 is a convex surface.

The first mirror surface 610 is provided for the surface, facing the projection unit 2, of the holding portion 612. The first mirror surface 610 may be configured as a metal film formed by evaporation, for example, on the surface, facing the projection unit 2, of the holding portion 612.

The pair of fixing portions 613 are respectively provided for both longitudinal end surfaces of the holding portion 612. Each fixing portion 613 is formed integrally with the holding portion 612 and protrudes from the holding portion 612 outward along the longitudinal axis of the holding portion 612.

The casing 7 includes a positioning structure 76 and a sandwiching structure 77. The sandwiching structure 77 holds the first mirror 61 by sandwiching the first mirror 61 in the third direction D3. The positioning structure 76 positions the first mirror 61 to regulate the movement of the first mirror 61 in a direction intersecting with the third direction D3. That is to say, the positioning structure 76 positions the first mirror 61 in a direction intersecting with a sandwiching direction in which the first mirror 61 (more specifically, a mounting portion 614 thereof as will be described later) is sandwiched between the first member 71 and the second member 72. Specifically, the positioning structure 76 according to this embodiment positions the first mirror 61 both in the first direction D1 perpendicular to the third direction D3 (sandwiching direction) and the second direction D2 perpendicular to not only the third direction D3 but also the first direction D1.

On the bottom portion 710 of the first member 71 of the casing 7, provided are a pair of fixing bases 714 corresponding one to one to the pair of fixing portions 613. Each of the fixing bases 714 protrudes toward the second member 72. Each of the fixing portions 613 is installed and fixed on a corresponding one of the fixing bases 714. This allows the first mirror 61 to be fixed onto the first member 71.

A first fixing portion 613a, which is one of the pair of fixing portions 613, includes a mounting portion 614 and a positioning portion 615. A second fixing portion 613b, which is the other fixing portion 613, includes two mounting portions 614 and a positioning portion 615. That is to say, the holding member 611 includes three mounting portions 614 in total and two positioning portions 615 in total.

Each mounting portion 614 is a protruding portion which is curved to protrude away from its corresponding fixing base 714. Each positioning portion 615 is a protruding portion which is curved to protrude away from its corresponding fixing base 714. The mounting portion 614 of the first fixing portion 613a is provided at one end in the third direction D3 of the first fixing portion 613a. The two mounting portions 614 of the second fixing portion 613b are provided at both ends in the third direction D3 of the second fixing portion 613b. The positioning portion 615 of each fixing portion 613 is provided in the middle in the third direction D3 of the fixing portion 613. The three mounting portions 614 and the two positioning portions 615 of the holding member 611 do not overlap with each other when viewed in the third direction D3 and are spaced apart from each other in the first direction D1 and the second direction D2.

A first fixing base 714a, which is a fixing base 714, corresponding to the first fixing portion 613a, out of the pair of fixing bases 714, includes a base portion 715 corresponding to the mounting portion 614 of the first fixing portion 613a and a fitting portion 716 corresponding to the positioning portion 615 of the first fixing portion 613a. A second fixing base 714b, which is a fixing base 714, corresponding to the second fixing portion 613b, out of the pair of fixing bases 714, includes two base portions 715 respectively corresponding to the two mounting portions 614 of the second fixing portion 613b and a fitting portion 716 corresponding to the positioning portion 615 of the second fixing portion 613b.

Each base portion 715 is a projection protruding toward its corresponding mounting portion 614. Each fitting portion 716 is a projection protruding in the third direction D3 toward its corresponding positioning portion 615 and is formed in the shape of a circular column, of which the axis is parallel to the third direction D3.

Each mounting portion 614 of the holding member 611 has an installation portion 616. The installation portion 616 of each mounting portion 614 is formed in the shape of a rectangular plate, of which the thickness is parallel to the third direction D3. Both surfaces along the thickness of the installation portion 616 of each mounting portion 614 are planes which are perpendicular to the third direction D3. Each base portion 715 of the first member 71 has an installation surface 717 perpendicular to the third direction D3. Each mounting portion 614 of the holding member 611 is installed such that one surface along the thickness of the installation portion 616 is directly in contact with the installation surface 717 of its corresponding base portion 715. The first mirror 61 is in contact with the casing 7 only at the three mounting portions 614.

Each positioning portion 615 of the holding member 611 has a hole 617 that penetrates in the third direction D3 through the positioning portion 615. Each fitting portion 716 of the first member 71 is fitted into the hole 617 of its corresponding positioning portion 615. Each fitting portion 716 of the first member 71 regulates the movement of its corresponding positioning portion 615 in a direction intersecting with the third direction D3. That is to say, in this embodiment, the positioning structure 76 is formed by the plurality of fitting portions 716 of the holding member 611.

The hole 617 of the positioning portion 615 of the first fixing portion 613a is formed in a square shape when viewed in the third direction D3. The hole 617 of the positioning portion 615 of the first fixing portion 613a has approximately the same dimensions in the first direction D1 and the second direction D2 as its corresponding fitting portion 716. Thus, the positioning portion 615 of the first fixing portion 613a has its movement in the first direction D1 and the second direction D2 regulated by its corresponding fitting portion 716.

The hole 617 of the positioning portion 615 of the second fixing portion 613b is formed in the shape of a rectangle, of which the dimension in the second direction D2 is longer than its dimension in the first direction D1 when viewed in the third direction D3. The dimension in the first direction D1 of the hole 617 of the positioning portion 615 of the second fixing portion 613b is approximately equal to the dimension in the first direction D1 of its corresponding fitting portion 716. The dimension in the second direction D2 of the hole 617 of the positioning portion 615 of the second fixing portion 613b is larger than the dimension in the second direction D2 of its corresponding fitting portion 716. Thus, the positioning portion 615 of the second fixing portion 613b has its movement in the first direction D1 regulated with its movement in the second direction D2 allowed by its corresponding fitting portion 716. Regulating the movement in the first direction D1 of the positioning portion 615 of the second fixing portion 613b in this manner allows regulating the rotation of the first fixing base 714a of the holding member 611 around the fitting portion 716.

The first mirror 61 further includes three cushioning members 618. Each of the cushioning members 618 is made of a urethane foam resin and has elasticity. Each of the cushioning members 618 just needs to be a member with elasticity and may be made of rubber, for example. The three cushioning members 618 correspond one to one to the three mounting portions 614 of the holding member 611. Each of the cushioning members 618 is formed in the shape of a rectangular plate when viewed in the third direction D3. Each of the cushioning members 618 is attached, with a double-sided adhesive tape, onto one surface, facing the second member 72 (i.e., a surface facing away from the first member 71), out of the two surfaces along the thickness of the installation portion 616 of its corresponding mounting portion 614. Note that the means for attaching each cushioning member 618 onto its corresponding mounting portion 614 does not have to be a double-sided adhesive tape but may also be an adhesive, for example.

Figure 16:
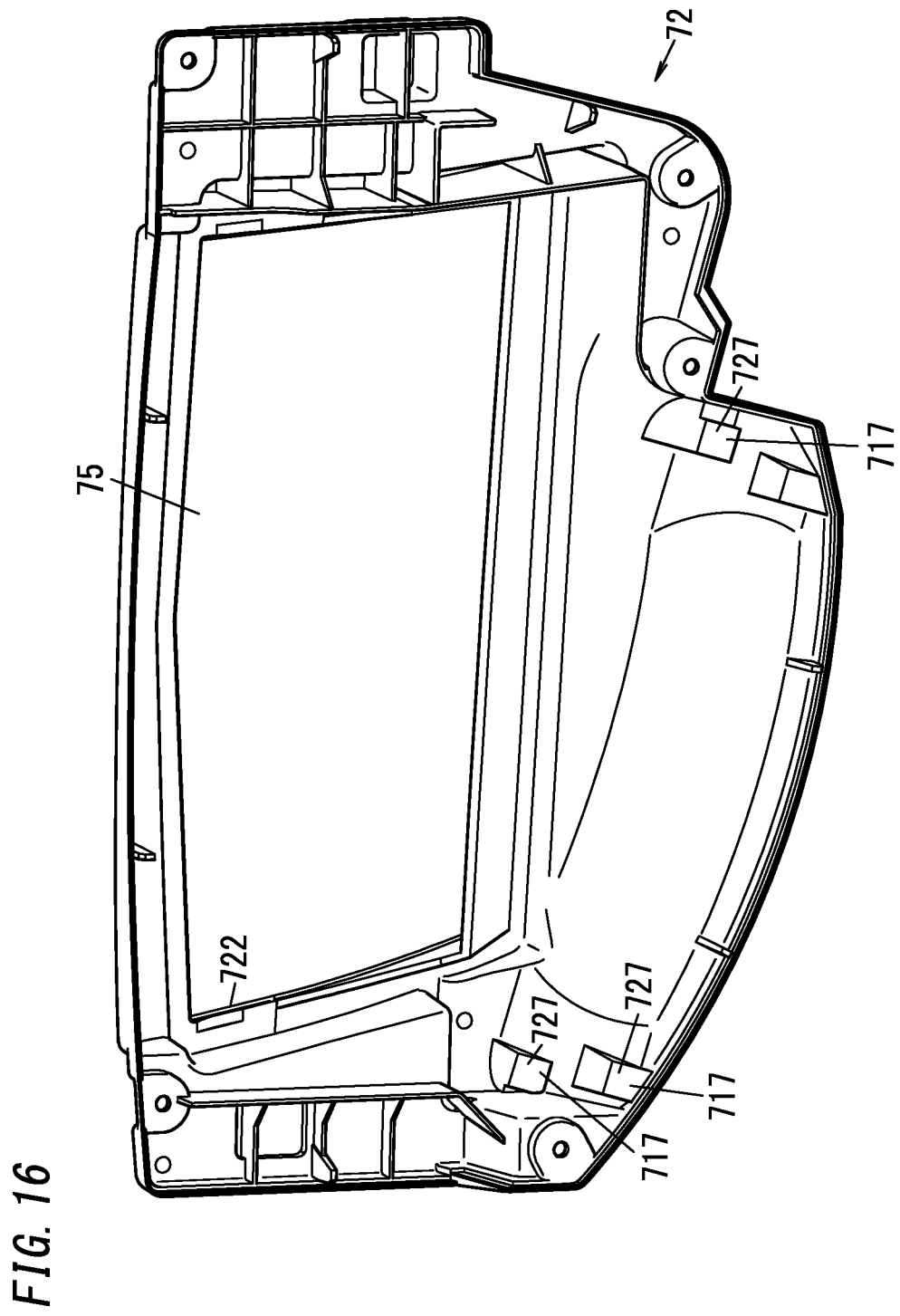
FIG. 16 is a perspective view of a second member included in the display system.

As shown in FIG. 16, the second member 72 of the casing 7 includes three press members 727. The three press members 727 correspond one to one to the three mounting portions 614 of the first mirror 61 and also correspond to the three cushioning members 618 of the first mirror 61. Each press member 727 is a projection which is bent to protrude toward the first member 71. Each press member 727 presses the installation portion 616 of its corresponding mounting portion 614 in the third direction D3 against the first member 71 via its corresponding cushioning member 618. This allows each mounting portion 614 of the first mirror 61 to be sandwiched and fixed between its corresponding press member 727 and its corresponding base portion 715 via its corresponding cushioning member 618. That is to say, in this embodiment, the sandwiching structure 77 for sandwiching the first mirror 61 is formed by the three press members 727, the three cushioning members 618, and the three mounting portions 614.

As can be seen, in the first mirror 61 according to this embodiment, the plurality of mounting portions 614 are sandwiched between the first member 71 and second member 72 of the casing 7. This allows fixing the first mirror 61 by using the casing 7. In addition, this also allows fixing the first mirror 61 to the casing 7 without using any adhesive, thus shortening the time it takes to manufacture the display system 1. Furthermore, in the display system 1 according to this embodiment, the cushioning members 618 are provided between the mounting portions 614 and the second member 72. This reduces, even if the casing 7 expands thermally, for example, the chances of the force being applied from the casing 7 to the respective mounting portions 614, thus reducing the deformation of the first mirror 61 due to the application of force from the casing 7 to the mounting portions 614. Among other things, this may reduce the deformation of the first mirror surface 610, which is important for the display system 1 that projects the virtual image 91 by emitting the display light.

Furthermore, in the display system 1 according to this embodiment, the cushioning members 618 are provided only between the mounting portions 614 and the second member 72 and the installation portion 616 of each mounting portion 614 is directly in contact with its corresponding base portion 715 of the first member 71. This allows positioning the first mirror 61 with respect to the first member 71 accurately. In addition, in the first mirror 61 according to this embodiment, only the three mounting portions 614 are sandwiched between the first member 71 and the second member 72. This allows the first mirror 61 to be sandwiched at only the three points where the three mounting portions 614 are provided. That is to say, in this case, the first mirror 61 may be positioned accurately by sandwiching the first mirror 61 only at the minimum required three points to define a plane.

Furthermore, the positioning structure 76 according to this embodiment includes a pair of fitting structures, each of which is made up of the hole 617 of the positioning portion 615 and the fitting portion 716 to be fitted into the hole 617. Also, in one of the pair of fitting structures, the fitting position 716 is fitted into the hole 617 while being positioned in both of the first direction D1 and the second direction D2. Meanwhile, in the other of the pair of fitting structures, the fitting position 716 is fitted into the hole 617 while being positioned in only the first direction D1 out of the first direction D1 and the second direction D2. The fitting portion 716 of the other fitting structure of the positioning structure 76 is positioned in only the first direction D1, and therefore, may be fitted easily into the hole 617. This facilitates positioning the first mirror 61 in the first direction D1 and the second direction D2. In this embodiment, the fitting portions 716 are provided for the first member 71 and the holes 617 are provided through the first mirror 61. Alternatively, the fitting portions 716 may be provided for the first mirror 61 and the holes 617 may be provided through the first member 71.

In this embodiment, the cushioning members 618 are attached to only one surface, facing the second member 72, out of the two surfaces along the thickness of the installation portions 616. Alternatively, the cushioning members 618 may be attached to only one surface, facing the first member 71, out of the two surfaces along the thickness of the installation portions 616. That is to say, in the latter case, the cushioning members 618 will be located between the mounting portions 614 and the second member 72. Still alternatively, the cushioning members 618 may also be attached to both surfaces along the thickness of the installation portions 616. That is to say, in that case, the cushioning members 618 will be located between the mounting portions 614 and the first member 71 and between the mounting portions 614 and the second member 72. Yet alternatively, the cushioning members 618 may be attached to their corresponding press members 727 of the second member 72 instead of the first mirror 61. Yet alternatively, the cushioning members 618 may be omitted and the installation portion 616 of each mounting portion 614 may be sandwiched between the first member 71 and the second member 72 so as to be in contact with each of the first member 71 and the second member 72. In that case, the first mirror 61 may be positioned accurately by bringing the installation portion 616 of each mounting portion 614 into contact with the first member 71 and the second member 72.

(1.5) Method for Manufacturing Display System

Next, a method for manufacturing the display system 1 will be described. The method for manufacturing the display system 1 includes a projection unit mounting step, a built-in components attaching step, and a casing assembling step. The projection unit mounting step is the step of mounting the projection unit 2 onto the first member 71 of the casing 7 as shown in FIG. 3. In the projection unit mounting step, the housing 4 of the projection unit 2 is fixed onto the first member 71 with the plurality of fastening members 42 (see FIG. 2). In this manner, the projection unit 2 is mounted onto the first member 71. In the projection unit 2, the elastic member 5 fixed to the housing 4 regulates the movement of the first heat sink 25, the diffuser plate 27, the heat transfer member 24, and the display 3 toward the elastic member 5. This prevents, when the housing 4 is fixed onto the first member 71, the first heat sink 25, the diffuser plate 27, the heat transfer member 24, and the display 3 from coming out of the cylindrical portion 40 easily, thus facilitating fixing the housing 4 onto the first member 71. This also makes the projection unit 2 yet to be mounted to the casing 7 easily portable.

The built-in components attaching step is the step of attaching the first mirror 61, the second mirror 62, and other members, which are components to be built in the casing 7 shown in FIG. 6, to the first member 71 of the casing 7. The built-in components attaching step may be performed either after or before the projection unit mounting step, whichever is appropriate. To attach the first mirror 61 to the first member 71 in the built-in components attaching step, the first mirror 61 and the first member 71 may be brought closer to each other in the third direction D3. In that case, the first mirror 61 may be brought closer to the first member 71 by moving the first mirror 61 parallel to the third direction D3. Alternatively, the first member 71 may be brought closer to the first mirror 61 by moving the first member 71 parallel to the third direction D3. Bringing the first mirror 61 and the first member 71 closer to each other in the third direction D3 in this manner allows the installation portion 616 (see FIG. 15) of each mounting portion 614 of the first mirror 61 to be installed on the installation surface 717 of its corresponding base portion 715 of the first member 71 and also allows each fitting portion 716 of the first mirror 61 to be fitted into the hole 617 of its corresponding positioning portion 615. This allows the first mirror 61 to be attached to the first member 71.

The casing assembling step is performed after the built-in components attaching step. The casing assembling step is the step of combining the first member 71 and the second member 72 with each other and then fixing the second member 72 onto the first member 71 with a plurality of fastening members 73. The casing assembling step may be performed either after or before the projection unit mounting step, whichever is appropriate. To combine the first member 71 and the second member 72 in the casing assembling step, the first member 71 and the second member 72 may be brought closer to each other in the third direction D3. In that case, the first member 71 may be brought closer to the second member 72 by moving the first member 71 parallel to the third direction D3. Alternatively, the second member 72 may be brought closer to the first member 71 by moving the second member 72 parallel to the third direction D3. Bringing the first member 71 and the second member 72 closer to each other in the third direction D3 in this manner allows the installation portion 616 of each mounting portion 614 of the first mirror 61 to be pressed by its corresponding press member 727 of the second member 72 in the third direction D3 against the first member 71 via its corresponding cushioning member 618. In this manner, the first member 71 and the second member 72 may be combined with each other.

(2) Variations

The display system 1 according to the embodiment described above may be modified as appropriate. For example, in the embodiment described above, the shielding member (first member 71) defining the shape of the light emerging from the display screen 32 of the display 3 is located on the optical path of the light emerging from the display screen 32. However, the shielding member only needs to define the shape of the light emerging from the display screen 32 and may define the shape of the illuminating light emitted from the light source 20 to irradiate the display 3.

Also, the display 3 does not have to be a liquid crystal display. Alternatively, the display 3 may also be an image display device other than a liquid crystal display. Examples of such display devices include an original electroluminescent display or a laser display. Furthermore, the display 3 does not have to be an image display device itself. For example, the display 3 may also be a system including a projector and a screen on which an image is projected from the projector. Still alternatively, the display 3 may also be a system including a laser scanner and a screen on which an image that has been scanned with a laser beam by the laser scanner is produced. Yet alternatively, the display 3 may be a screen itself or a plane mirror to reflect an image projected from the image display device. That is to say, the display 3 may display an intermediate image thereon. Furthermore, the optical system 6 may include only one mirror or three or more mirrors. Optionally, the display system 1 may include no optical system 6.

Furthermore, the respective shapes of the first member 71, the second member 72, and the cover 75, the shapes of the respective members of the first mirror 61, the shape of the second mirror 62, and the shapes of the respective members of the projection unit 2 may be changed. Also, the respective materials of the first member 71, the second member 72, and the cover 75, the materials of the respective members of the first mirror 61, the material of the second mirror 62, and the materials of the respective members of the projection unit 2 may also be changed. Furthermore, any of the members of the display system 1 may be omitted as appropriate. For example, the display system 1 may be implemented as the projection unit 2.

Furthermore, the moving vehicle 8 including the display system 1 may also be an automobile including the driver's seat 81 and the steering wheel 82 in the left half of the moving vehicle body 80. Furthermore, the display system 1 does not have to be a head-up display for use in automobiles. Alternatively, the display system 1 is also applicable for use in any of various types of moving vehicles 8 other than automobiles. Examples of those moving vehicles 8 include two-wheeled vehicles, railway trains, aircrafts, construction machines, and watercrafts. Optionally, the display system 1 may also be used in an amusement facility, for example.

(3) Aspects

As can be seen from the foregoing description of an exemplary embodiment and its variations, a display system (1) according to a first aspect includes a display (3) and a shielding member. The display (3) has a display screen (32) to display an image thereon. The shielding member has an opening (712), through which light emerging from the display screen (32) passes. The shielding member defines a shape of the light emerging from the display screen (32). The display screen (32) has a non-rectangular display area (33) to display the image thereon. At least one peripheral edge of the opening (712) defines a shape that conforms to an outer peripheral shape of the display area (33).

According to this aspect, defining the shape of the light emerging from the display screen (32) by the at least one peripheral edge of the opening (712) may bring the outer peripheral shape of the light emerging from the display screen (32) into conformity with the outer peripheral shape of the light emerging from the display area (33). This enables projecting, onto a target space (93), a virtual image (91), of which the appearance is good enough to make the image look hardly unnatural to the viewer's eyes.

A display system (1) according to a second aspect may be implemented in conjunction with the first aspect. In the second aspect, the display area (33) is an area on which an image to be presented as a virtual image (91) in a target space (93) is displayed.

This aspect allows a virtual image (91), of which the appearance is good enough to make the image look hardly unnatural to the viewer's eyes, to be projected onto the target space (93).

A display system (1) according to a third aspect may be implemented in conjunction with the first or second aspect. In the third aspect, the at least one peripheral edge of the opening (712) includes a plurality of peripheral edges. The plurality of peripheral edges defines a shape, at least one side of which is curved.

This aspect allows, when the display area (33) has at least one curved side, a virtual image (91), of which the appearance is good enough to make the image look hardly unnatural to the viewer's eyes, to be projected onto the target space (93).

A display system (1) according to a fourth aspect may be implemented in conjunction with any one of the first to third aspects. In the fourth aspect, the opening (712) is located on an optical path of the light emerging from the display screen (32).

This aspect allows a virtual image (91), of which the appearance is good enough to make the image look hardly unnatural to the viewer's eyes, to be projected onto the target space (93) by defining the shape of the light emerging from the display screen (32) by the at least one peripheral edge of the opening (712).

A display system (1) according to a fifth aspect may be implemented in conjunction with the fourth aspect. In the fifth aspect, the shielding member includes a tilted surface (713). The tilted surface (713) forms the at least one peripheral edge of the opening (712). The tilted surface (713) is tilted such that the shorter a distance from a point on the tilted surface (713) to the display screen (32) is, the closer to either an outer peripheral edge of the opening (712) or an inner peripheral edge of the opening (712) the point on the tilted surface (713) is.

This aspect may reduce the proportion of the light emerging from the display screen (32) which is cut off by the at least one peripheral edge of the opening (712), thus enabling making a more effective use of the display area (33) of the display screen (32).

A display system (1) according to a sixth aspect may be implemented in conjunction with the fifth aspect. In the sixth aspect, the tilted surface (713) is tilted such that the shorter the distance from the point on the tilted surface (713) to the display screen (32) is, the closer to the outer peripheral edge of the opening (712) the point on the tilted surface (713) is.

This aspect reduces the chances of the light emerging from the display screen (32) which travels along an optical path tilted inward with respect to the optical axis being cut off by the at least one peripheral edge of the opening (712), thus reducing the proportion of the light emerging from the display screen (32) which is cut off by the at least one peripheral edge of the opening (712).

A display system (1) according to a seventh aspect may be implemented in conjunction with any one of the first to sixth aspects. In the seventh aspect, the display system (1) further includes an elastic member (5). The elastic member (5) is interposed between the shielding member and the display screen (32).

This aspect allows the impact and vibration transmitted from the shielding member to the display screen (32) to be reduced by the elastic member (5).

A display system (1) according to an eighth aspect may be implemented in conjunction with any one of the first to seventh aspects. In the eighth aspect, the at least one peripheral edge of the opening (712) and an outer periphery of the display area (33) have similar shapes.

According to this aspect, defining the shape of the light emerging from the display screen (32) by the at least one peripheral edge of the opening (712) may make the outer peripheral edge shape of the light emerging from the display screen (32) similar to the outer peripheral shape of the light emerging from the display area (33). This enables projecting, onto the target space (93), a virtual image (91), of which the appearance is further improved.

A display system (1) according to a ninth aspect may be implemented in conjunction with any one of the first to eighth aspects. In the ninth aspect, the opening (712) has a larger size than the display area (33).

This aspect reduces, even when the dimensions of respective members that form the display system (1) or the mounting positions thereof are somewhat different from the designed ones, the chances of the light emerging from the display area (33) being cut off by the at least one peripheral edge of the opening (712) of the shielding member. This enables projecting, onto the target space (93), a virtual image (91), of which the appearance is further improved.

A display system (1) according to a tenth aspect may be implemented in conjunction with any one of the first to ninth aspects. In the tenth aspect, the shielding member is attachable to, and removable from, the display system (1).

This aspect allows the shielding member to be removed from the other members of the display system (1) and replaced with another shielding member, of which the opening (712) has a different shape. This enables, even when the display system (1) is installed in another device, for example, projecting a good-looking virtual image (91) just by replacing the shielding member.

A moving vehicle (8) according to an eleventh aspect includes a moving vehicle body (80) and the display system (1) according to any one of the first to tenth aspects. The display system (1) is installed in the moving vehicle body (80).

This aspect allows the display system (1) to be used in the moving vehicle (8).

A display system (1) according to a twelfth aspect includes a display (3), a housing (4), and a heat sink (25). The display (3) has a display screen (32) to display an image thereon. The housing (4) houses the display (3) therein. The heat sink (25) dissipates heat generated by the display (3). The housing (4) covers the heat sink (25) in at least one of four directions defined for the heat sink (25).

According to this aspect, the housing (4) covers the heat sink (25) in at least one of four directions, thus reducing the chances of the heat sink (25) gathering dust, dirt, and other foreign particles.

A display system (1) according to a thirteenth aspect may be implemented in conjunction with the twelfth aspect. In the thirteenth aspect, the housing (4) covers the heat sink (25) in three out of the four directions defined for the heat sink (25).

This aspect further reduces the chances of the heat sink (25) gathering dust, dirt, and other foreign particles.

A display system (1) according to a fourteenth aspect may be implemented in conjunction with the twelfth or thirteenth aspect. In the fourteenth aspect, the heat sink (25) supports the display (3) from the opposite side from the display screen (32).

This aspect allows the heat sink (25) to substantially prevent the display (3) from moving away from the display screen (32).

A display system (1) according to a fifteenth aspect may be implemented in conjunction with the fourteenth aspect. In the fifteenth aspect, the heat sink (25) includes a contact portion (250) and an extended portion (254). The contact portion (250) is in contact with a surface, opposite from the display screen (32), of the display (3). The extended portion (254) is connected to the contact portion (250). The extended portion (254) includes a portion which is located closer to the display screen (32) than to the surface, opposite from the display screen (32), of the display (3) and which is located outside of the housing (4).

This aspect may improve the heat dissipation capability of the heat sink (25) by providing a part of the extended portion (254) outside of the housing (4).

A display system (1) according to a sixteenth aspect may be implemented in conjunction with any one of the twelfth to fifteenth aspects. In the sixteenth aspect, the heat sink (25) has a plate shape.

This aspect allows the heat sink (25) to be easily made of a plate member.

A display system (1) according to a seventeenth aspect may be implemented in conjunction with any one of the twelfth to sixteenth aspects. In the seventeenth aspect, the housing (4) positions the display (3).

This aspect allows either omitting the capability of positioning the display (3) from the heat sink (25) or simplifying the structure of the heat sink (25). This facilitates manufacturing the heat sink (25).

A display system (1) according to an eighteenth aspect may be implemented in conjunction with any one of the twelfth to seventeenth aspects. In the eighteenth aspect, the display system (1) further includes a light source (20) and a second heat sink (26). The second heat sink (26) is thermally connected to the light source (20). The display (3) is a liquid crystal display panel for producing an image based on the light emitted from the light source (20). The display system (1) further has a thermal insulation structure (100) provided between a first heat sink (25), serving as the heat sink (25), and the second heat sink (26).

According to this aspect, the thermal insulation structure (100) reduces the chances of the heat of the second heat sink (26) being transferred to the first heat sink (25), thus curbing a decline in the heat dissipation capability of the first heat sink (25).

A display system (1) according to a nineteenth aspect may be implemented in conjunction with the eighteenth aspect. In the nineteenth aspect, the thermal insulation structure (100) has a thermal insulation space (101).

According to this aspect, the thermal insulation space (101) reduces the chances of the heat of the second heat sink (26) being transferred to the first heat sink (25).

A display system (1) according to a twentieth aspect may be implemented in conjunction with the nineteenth aspect. In the twentieth aspect, the first heat sink (25) and the second heat sink (26) each have a heat-dissipating portion (255, 260) provided outside of the housing (4). The thermal insulation space (101) is located, outside of the housing (4), between the heat-dissipating portion (255) of the first heat sink (25) and the heat-dissipating portion (260) of the second heat sink (26).

According to this aspect, the thermal insulation space (101) reduces the chances of the heat of the heat-dissipating portion (260) of the second heat sink (26) being transferred to the heat-dissipating portion (255) of the first heat sink (25), thus curbing a decline in the heat dissipation capability of the first heat sink (25).

A moving vehicle (8) according to a twenty-first aspect includes a moving vehicle body (80) and the display system (1) according to any one of the twelfth to twentieth aspects. The display system (1) is installed in the moving vehicle body (80).

This aspect allows the display system (1) to be used in the moving vehicle (8).

A display system (1) according to a twenty-second aspect includes a display (3), an elastic member (5), and a shielding member. The display (3) has a display screen (32) to display an image thereon. The shielding member has an opening (712), through which light emerging from the display screen (32) passes. The shielding member defines a shape of the light emerging from the display screen (32). The shielding member sandwiches the elastic member (5) between itself and the display (3). The display (3) presses the elastic member (5) against the shielding member.

According to this aspect, the display (3) presses the elastic member (5) against the shielding member, thereby fixing the elastic member (5). This may reduce the number of parts that form the display system (1), compared to a situation where the elastic member (5) is pressed against another member different from the shielding member. In addition, this may also shorten the distance from the display (3) to the shielding member. This reduces the proportion of the light emerging from the display screen (32) which is cut off the shielding member, thus allowing making a more effective use of the display screen (32).

A display system (1) according to a twenty-third aspect may be implemented in conjunction with the twenty-second aspect. In the twenty-third aspect, the display system (1) further includes a housing (4) to hold the display (3). The housing (4) presses the elastic member (5) against the shielding member.

According to this aspect, the elastic member (5) may be fixed even more firmly by being pressed against the shielding member by the housing (4).

A display system (1) according to a twenty-fourth aspect may be implemented in conjunction with the twenty-third aspect. In the twenty-fourth aspect, the display (3) presses a first part, surrounding a portion corresponding to the opening (712), of the elastic member (5) against the shielding member. The housing (4) presses a second part, surrounding the first part, of the elastic member (5) against the shielding member.

According to this aspect, the elastic member (5) is pressed at two points, namely, at the first part and second part, against the shielding member by the display (3) and the housing (4). This reduces the chances of dust, dirt, and other foreign particles entering the housing (4) through the gap between the housing (4) and the shielding member.

A display system (1) according to a twenty-fifth aspect may be implemented in conjunction with the twenty-third or twenty-fourth aspect. In the twenty-fifth aspect, the elastic member (5) is fixed to the housing (4). The display (3) is fixed by the elastic member (5) to the housing (4).

According to this aspect, the display (3) is fixed by the elastic member (5) that is fixed to the housing (4). This may reduce the number of parts that form the display system (1) compared to a situation where a member for fixing the display (3) is provided separately.

A display system (1) according to a twenty-sixth aspect may be implemented in conjunction with any one of the twenty-second to twenty-fifth aspects. In the twenty-sixth aspect, the display system (1) further includes an optical system (6) and a casing (7). The optical system (6) irradiates a predetermined region with the light emerging from the display screen (32). The casing (7) holds the optical system (6) thereon. The shielding member forms part of the casing (7).

This aspect allows a part of the casing (7) that holds the optical system (6) to serve as the shielding member.

A display system (1) according to a twenty-seventh aspect may be implemented in conjunction with any one of the twenty-second to twenty-sixth aspects. In the twenty-seventh aspect, the elastic member (5) has a window hole (54) corresponding to the opening (712). At least one peripheral edge of the window hole (54) is located outside of the at least one peripheral edge of the opening (712).

This aspect allows the light emerging from the display screen (32) to be guided to the opening (712) through the window hole (54) of the elastic member (5).

A display system (1) according to a twenty-eighth aspect may be implemented in conjunction with any one of the twenty-second to twenty-seventh aspects. In the twenty-eighth aspect, the display system (1) further includes a temperature sensor (28). The temperature sensor (28) is provided on a surface, facing the elastic member (5), of the display (3) and detects a temperature of the display (3). A sensor hole (53) is provided through a portion, facing the temperature sensor (28), of the elastic member (5).

This aspect reduces, even when force is applied from, for example, the shielding member to the elastic member (5), the chances of the force being transmitted to the temperature sensor (28) via the elastic member (5), thus reducing the frequency of occurrence of failures in the temperature sensor (28).

A display system (1) according to a twenty-ninth aspect may be implemented in conjunction with any one of the twenty-second to twenty-eighth aspects. In the twenty-ninth aspect, the shielding member has a plurality of guide surfaces. Each of the plurality of guide surfaces is a plane aligned with a surface, opposite from the display (3), of the elastic member (5).

This aspect allows sliding the elastic member (5) along the plurality of guide surfaces of the shielding member. Thus, the elastic member (5) may be easily arranged between the shielding member and the display (3).

A moving vehicle (8) according to a thirtieth aspect includes a moving vehicle body (80) and the display system (1) according to any one of the twenty-second to twenty-ninth aspects. The display system (1) is installed in the moving vehicle body (80).

This aspect allows the display system (1) to be used in the moving vehicle (8).

A display system (1) according to a thirty-first aspect includes a display (3), a mirror (61), and a casing (7). The mirror (61) has a mirror surface (610) that reflects light emerging from the display (3). The casing (7) houses the mirror (61) therein. The mirror (61) further has a mounting portion (614). The casing (7) includes a first member (71)

and a second member (72). The second member (72) is fixed to the first member (71) and sandwiches the mounting portion (614) between the first member (71) and the second member (72) itself.

This aspect allows the mirror (61) to be fixed by using the casing (7).

A display system (1) according to a thirty-second aspect may be implemented in conjunction with the thirty-first aspect. In the thirty-second aspect, the mirror (61) includes a holding member (611) of resin for holding the mirror surface (610). The mounting portion (614) is formed on the holding member (611).

This aspect allows the mirror (61) including the holding member (611) of resin for holding the mirror surface (610) to be fixed to the casing (7).

A display system (1) according to a thirty-third aspect may be implemented in conjunction with the thirty-first or thirty-second aspect. In the thirty-third aspect, a cushioning member (618) is provided between the mounting portion (614) and the first member (71) and/or between the mounting portion (614) and the second member (72).

According to this aspect, the cushioning member (618) having elasticity is provided between the mounting portion (614) and the first member (71) and/or between the mounting portion (614) and the second member (72). This reduces the chances of force being transmitted from the casing (7) to the mounting portion (614), thus reducing the deformation of the mirror surface (610) and other inconveniences due to the application of force from the casing (7) to the mounting portion (614).

A display system (1) according to a thirty-fourth aspect may be implemented in conjunction with the thirty-third aspect. In the thirty-fourth aspect, the cushioning member (618) is provided only either between the mounting portion (614) and the first member (71) or between the mounting portion (614) and the second member (72).

This aspect allows the mirror (61) to be positioned accurately by bringing a portion, opposite from the cushioning member (618), of the mounting portion (614) into contact with either the first member (71) or the second member (72).

A display system (1) according to a thirty-fifth aspect may be implemented in conjunction with the thirty-first or thirty-second aspect. In the thirty-fifth aspect, the mounting portion (614) is sandwiched between the first member (71) and the second member (72) to come into contact with each of the first member (71) and the second member (72).

This aspect allows the mirror (61) to be positioned accurately by bringing the mounting portion (614) into contact with the first member (71) and the second member (72).

A display system (1) according to a thirty-sixth aspect may be implemented in conjunction with any one of the thirty-first to thirty-fifth aspects. In the thirty-sixth aspect, the mirror (61) includes, as the mounting portion (614), three mounting portions (614) provided separately from each other. Only the three mounting portions (614) of the mirror (61) are sandwiched between the first member (71) and the second member (72).

This aspect allows the mirror (61) to be sandwiched at only the points where the three mounting portions (614) are located, i.e., at minimum required three points to define a plane, thus enabling the mirror (61) to be positioned accurately.

A display system (1) according to a thirty-seventh aspect may be implemented in conjunction with any one of the thirty-first to thirty-sixth aspects. In the thirty-seventh aspect, the mounting portion (614) is a protrusion formed on the mirror (61).

This aspect may reduce the area of the portion, sandwiched between the first member (71) and the second member (72), of the mounting portion (614), thus enabling the mirror (61) to be positioned accurately.

A display system (1) according to a thirty-eighth aspect may be implemented in conjunction with any one of the thirty-first to thirty-seventh aspects. In the thirty-eighth aspect, the casing (7) has a positioning structure (76). The positioning structure (76) positions the mirror (61) in a direction intersecting with a sandwiching direction in which the mounting portion (614) is sandwiched between the first member (71) and the second member (72).

This aspect allows the mirror (61) to be positioned by the positioning structure (76) in a direction intersecting with the sandwiching direction.

A display system (1) according to a thirty-ninth aspect may be implemented in conjunction with the thirty-eighth aspect. In the thirty-ninth aspect, the positioning structure (76) positions the mirror (61) in both a first direction (D1) perpendicular to the sandwiching direction and a second direction (D2) perpendicular to not only the sandwiching direction but also the first direction (D1).

This aspect allows the mirror (61) to be positioned by the positioning structure (76) in both the first direction (D1) perpendicular to the sandwiching direction and the second direction (D2) perpendicular to not only the sandwiching direction but also the first direction (D1).

A display system (1) according to a fortieth aspect may be implemented in conjunction with the thirty-ninth aspect. In the fortieth aspect, the positioning structure (76) includes a pair of fitting structures. Each of the pair of fitting structures is made up of a hole (617) provided through either one member selected from the first member (71) and the mirror (61) and a fitting portion (716) provided for the other member and fitted into the hole (617). In one of the pair of fitting structures, the fitting portion (716) thereof is fitted into the hole (617) so as to be positioned in both of the first direction (D1) and the second direction (D2). In the other fitting structure, the fitting portion (716) thereof is fitted into the hole (617) so as to be positioned in only the first direction (D1) out of the first direction (D1) and the second direction (D2).

According to this aspect, the fitting portion (716) of the other fitting structure of the positioning structure (76) is positioned only in the first direction (D1), and therefore, may be fitted into the hole (617) easily. This allows the mirror (61) to be positioned easily in the first direction (D1) and the second direction (D2).

A moving vehicle (8) according to a forty-first aspect includes a moving vehicle body (80) and the display system (1) according to any one of the thirty-first to fortieth aspects. The display system (1) is installed in the moving vehicle body (80).

This aspect allows the display system (1) to be used in the moving vehicle (8).

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

| Reference Signs List | |
|---|---|
| 1 | Display System |
| 3 | Display |
| 32 | Display Screen |
| 33 | Display Area |
| 5 | Elastic Member |
| 71 | First Member (Shielding member) |
| 712 | Opening |
| 713 | Tilted Surface |
| 8 | Moving Vehicle |
| 80 | Moving Vehicle Body |
| 91 | Image (Virtual Image) |
| 93 | Target Space |

The invention claimed is:

1. A display system, comprising:
a display including a display screen that displays an image thereon; and
a shielding member including an opening, through which light emerging from the display screen passes, the shielding member defining a shape of the light emerging from the display screen,
wherein the display screen includes a non-rectangular display area on which the image is displayed,
at least one peripheral edge of the opening defines a shape that conforms to an outer peripheral shape of the non-rectangular display area,
the opening is located on an optical path of the light emerging from the display screen,
the shielding member includes a tilted surface forming the at least one peripheral edge of the opening, and
the tilted surface of the shielding member is tilted such that, the closer a point on the tilted surface is to one of the at least one outer peripheral edge of the opening or an inner peripheral edge of the opening, the shorter a distance from the point on the tilted surface to the display screen is.

2. The display system of claim 1, wherein
the non-rectangular display area is an area on which the image is to be presented as a virtual image in a target space.

3. The display system of claim 2, wherein
the at least one peripheral edge of the opening includes a plurality of peripheral edges, and the plurality of peripheral edges defines the shape, with at least one side of the shape being curved.

4. The display system of claim 2, further comprising:
an elastic member interposed between the shielding member and the display screen.

5. The display system of claim 2, wherein
the at least one peripheral edge of the opening and an outer periphery of the non-rectangular display area have similar shapes.

6. The display system of claim 2, wherein
the opening has a larger size than the non-rectangular display area.

7. The display system of claim 1, wherein
the at least one peripheral edge of the opening includes a plurality of peripheral edges, and the plurality of peripheral edges defines the shape, with at least one side of the shape being curved.

8. The display system of claim 1, wherein
the tilted surface is tilted such that the shorter the distance from the point on the tilted surface to the display screen is, the closer to the outer peripheral edge of the opening the point on the tilted surface is.

9. The display system of claim 1, wherein
the at least one peripheral edge of the opening and an outer periphery of the non-rectangular display area have similar shapes.

10. The display system of claim 1, wherein
the shielding member is attachable to, and removable from, the display system.

11. A moving vehicle comprising:
a moving vehicle body; and
the display system of claim 1 installed in the moving vehicle body.

12. A display system, comprising:
a display including a display screen that displays an image thereon;
a shielding member including an opening, through which light emerging from the display screen passes, the shielding member defining a shape of the light emerging from the display screen; and
an elastic member interposed between the shielding member and the display screen,
wherein the display screen includes a non-rectangular display area on which the image is displayed, and
at least one peripheral edge of the opening defines a shape that conforms to an outer peripheral shape of the non-rectangular display area.

13. A display system, comprising:
a display including a display screen that displays an image thereon; and
a shielding member including an opening, through which light emerging from the display screen passes, the shielding member defining a shape of the light emerging from the display screen,
wherein the display screen includes a non-rectangular display area on which the image is displayed,
at least one peripheral edge of the opening defines a shape that conforms to an outer peripheral shape of the non-rectangular display area, and
the opening has a larger size than the non-rectangular display area.

* * * * *